(12) United States Patent
Tsutsui et al.

(10) Patent No.: US 6,243,583 B1
(45) Date of Patent: *Jun. 5, 2001

(54) COMMUNICATION SYSTEM

(75) Inventors: Yuichiro Tsutsui, Kawasaki; Masashi Hamada, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,376

(22) Filed: Dec. 16, 1996

Related U.S. Application Data

(63) Continuation of application No. 08/533,700, filed on Sep. 26, 1995, which is a continuation of application No. 08/147,400, filed on Nov. 5, 1993.

(30) Foreign Application Priority Data

Nov. 9, 1992 (JP) .................................................. 4-323651
Sep. 24, 1993 (JP) .................................................. 5-261571

(51) Int. Cl.[7] .................................................. H04Q 7/22
(52) U.S. Cl. ........................ 455/442; 455/436; 370/331
(58) Field of Search ........................... 379/58, 59, 60, 379/63; 455/33.1, 33.2, 33.3, 54.1, 56.1, 403, 422, 436–438, 442; 370/431, 437, 331, 337

(56) References Cited

U.S. PATENT DOCUMENTS

| | | | |
|---|---|---|---|
| 4,718,081 | * | 1/1988 | Brenig ........................ 379/60 |
| 4,759,051 | * | 7/1988 | Han ............................ 379/59 |
| 5,042,082 | * | 8/1991 | Dahlin ...................... 455/33.2 |
| 5,067,147 | * | 11/1991 | Lee ............................ 379/60 |
| 5,109,528 | * | 4/1992 | Uddenfeldt ............... 455/33.2 |
| 5,159,593 | * | 10/1992 | D'Amico et al. .......... 370/337 |
| 5,175,867 | * | 12/1992 | Wejke et al. ............. 455/33.2 |
| 5,210,752 | * | 5/1993 | Ito et al. .................. 370/337 |
| 5,243,598 | * | 9/1993 | Lee ............................ 379/60 |
| 5,303,289 | * | 4/1994 | Quinn ........................ 379/60 |

OTHER PUBLICATIONS

"Cellular Telephone Technology and Practice" Douglas Kerr. pp. 2:3, 3:3–4, 1994.*

* cited by examiner

Primary Examiner—William G. Trost

(57) ABSTRACT

A communication system such as a cordless telephone system in which a first or second master and a slave are connected by using either one of a plurality of radio communication channels of different frequencies, wherein the first master connects the slave by using one of the plurality of frequencies and the second master uses one of the plurality of frequencies used for connection between the first master and the slave in case of connecting the slave.

27 Claims, 22 Drawing Sheets

FIG. 7

| ID |
|---|
| TEL NUMBER |
| REGISTERED MASTER |
| EXISTENCE/INEXISTENCE OF CONFIDENTIAL SPEECH FUNCTION |
| CONFIDENTIAL SPEECH PATTERN |
| CONFIDENTIAL SPEECH USED ? |
| CURRENTLY-USED RADIO CH |

FIG. 8

| TEL NUMBER |
|---|
| EXISTENCE/INEXISTENCE OF CONFIDENTIAL SPEECH FUNCTION |
| ACCEPTABLE CH TYPE |

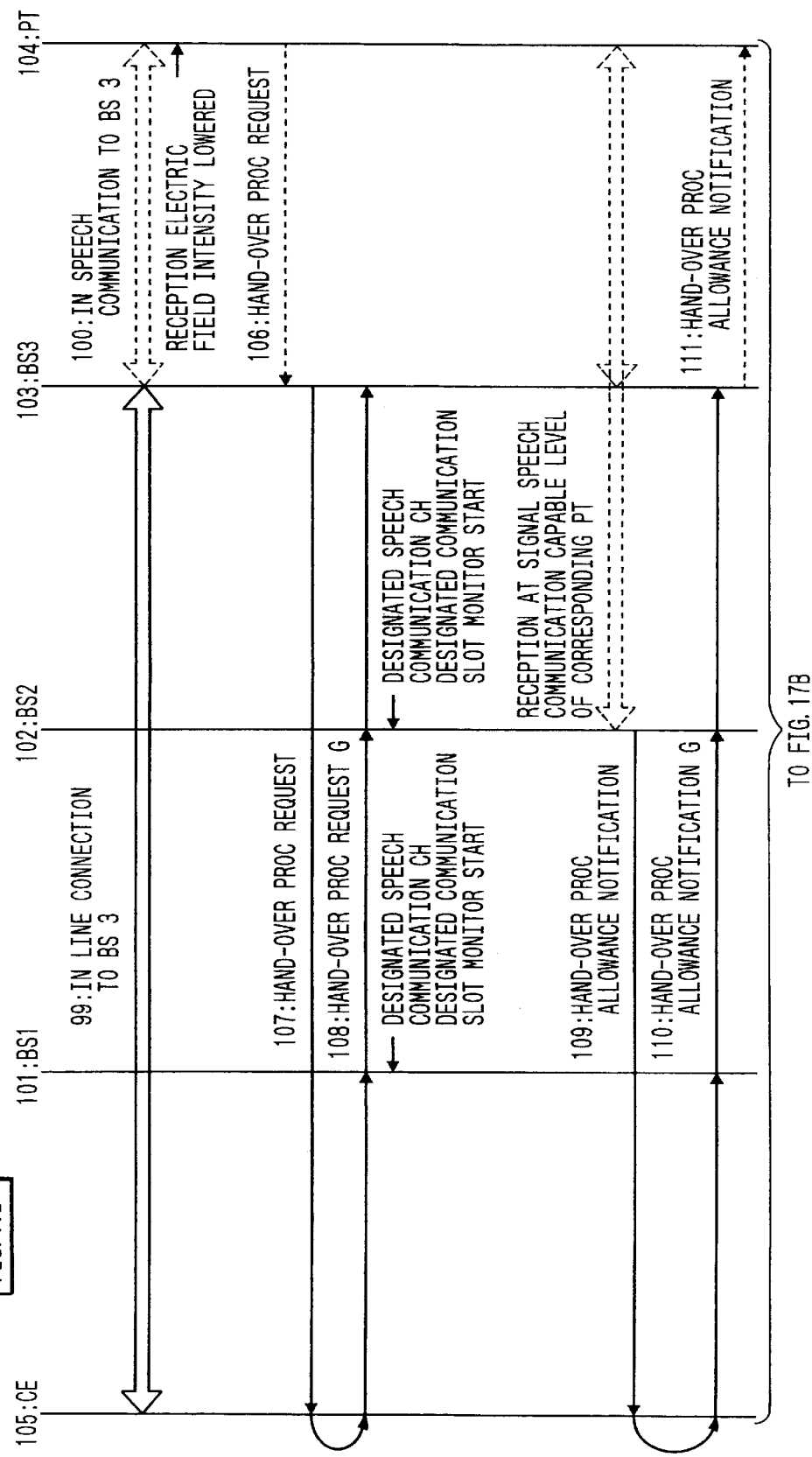

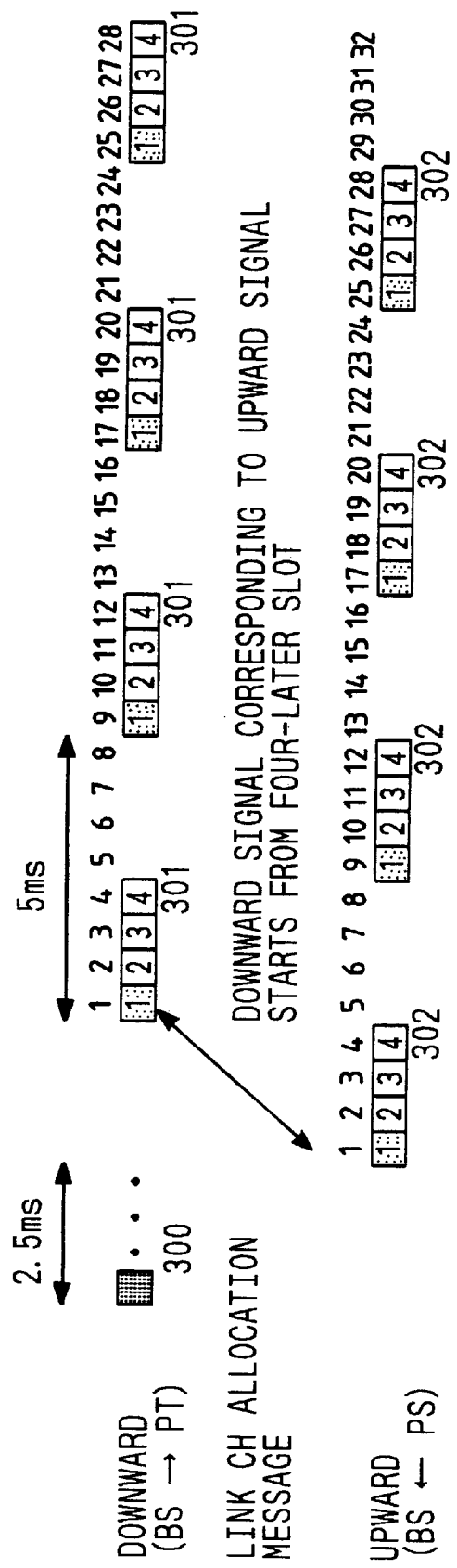

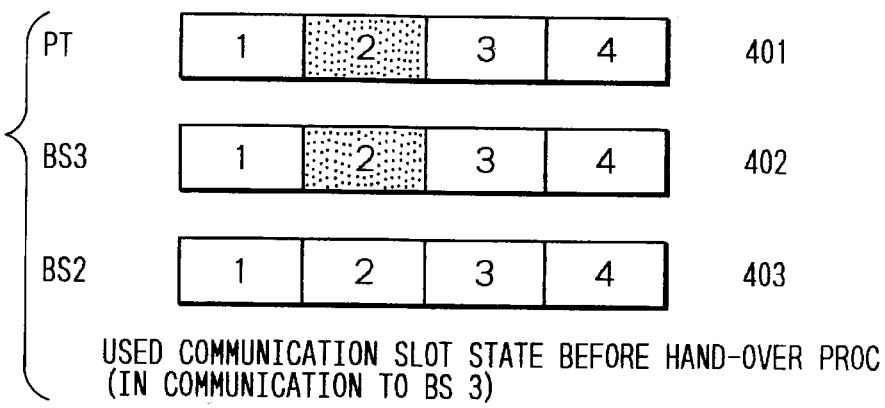

FIG. 19A

USED COMMUNICATION SLOT STATE BEFORE HAND-OVER PROC (IN COMMUNICATION TO BS 3)

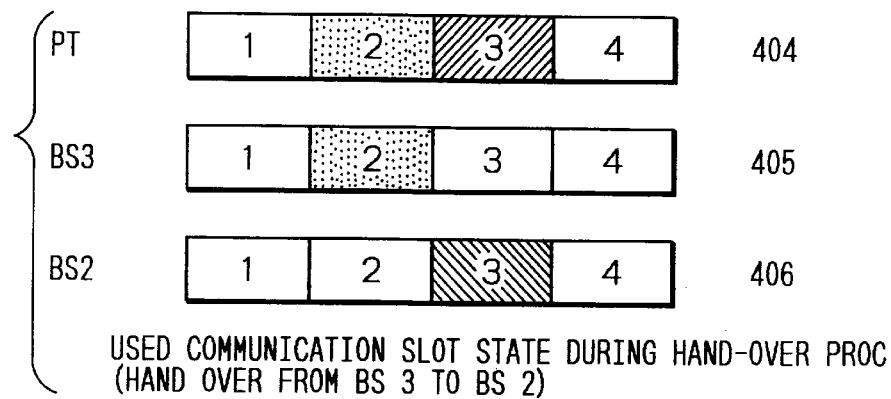

FIG. 19B

USED COMMUNICATION SLOT STATE DURING HAND-OVER PROC (HAND OVER FROM BS 3 TO BS 2)

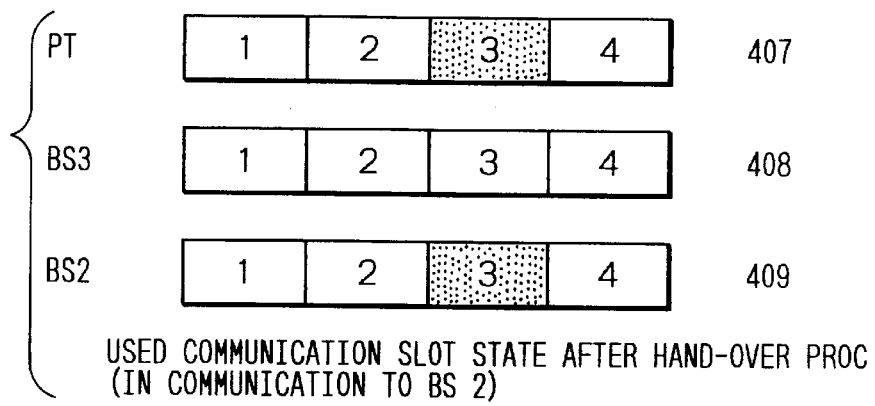

FIG. 19C

USED COMMUNICATION SLOT STATE AFTER HAND-OVER PROC (IN COMMUNICATION TO BS 2)

▨ COMMUNICATION SLOT IS USED IN TRANSMISSION/RECEPTION (BI-DIRECTIONAL COMMUNICATION)

▨ COMMUNICATION SLOT IS USED IN TRANSMISSION (ONE-DIRECTIONAL COMMUNICATION)

▨ COMMUNICATION SLOT IS USED IN RECEPTION (ONE-DIRECTIONAL COMMUNICATION)

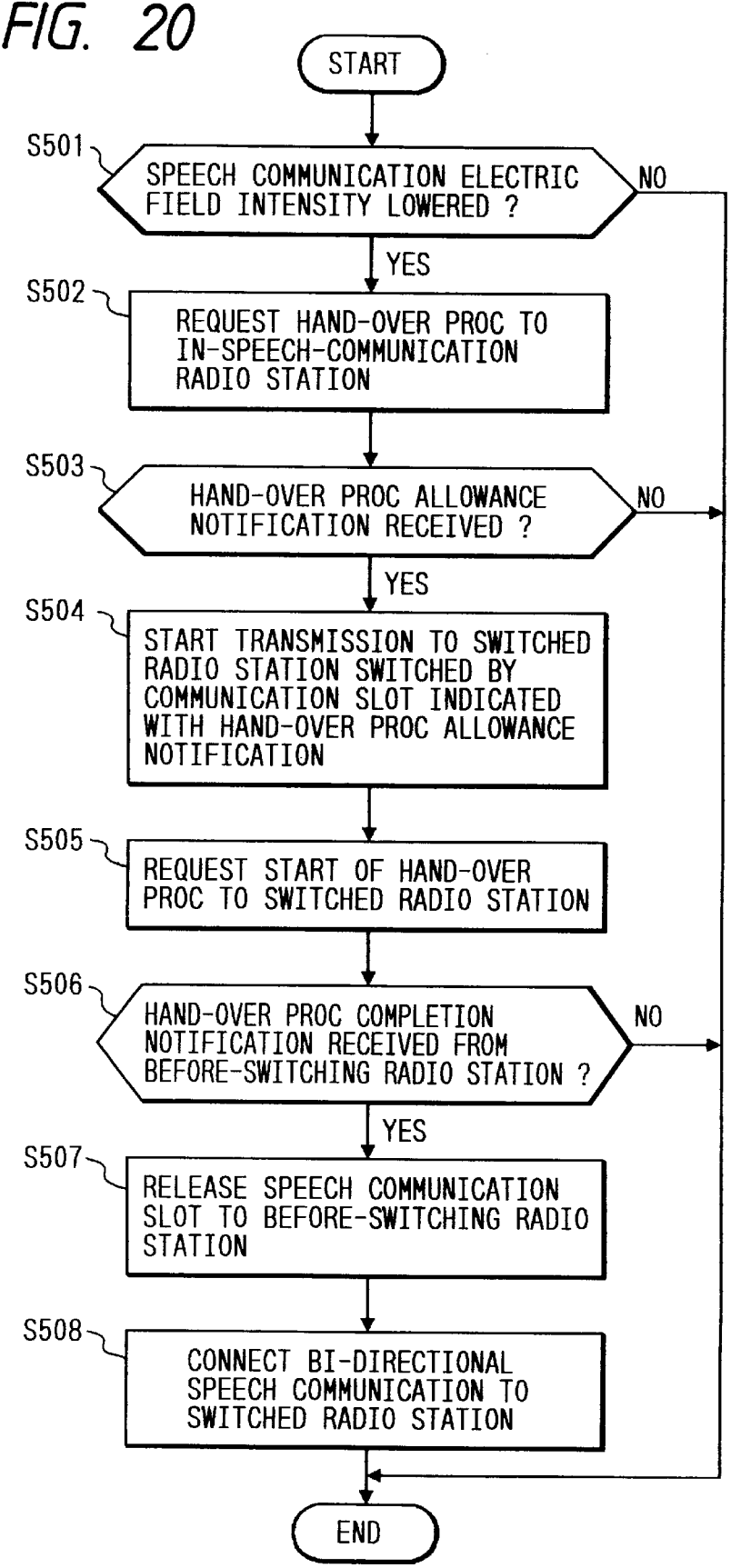

COMMUNICATION SYSTEM

This is a continuation of co-pending application Ser. No. 08/147,400, filed on Nov. 5, 1993. This is a continuation of co-pending application Ser. No. 08/533,700, filed on Sep.26, 1995.

BACKGROUND OF THE INVENTION

1. Field of the Invention

The invention relates to a communication system which performs a communication by using a plurality of frequencies.

2. Related Background Art

In recent years, a cordless telephone system has widely been spread and a cordless telephone system of a large scale in which a slaves are dynamically area controlled is being spread.

In such a system, in the case where the slave is moved to another area during the communication and the master connected is switched, a carrier sensing operation or the like is executed and a new communication channel is used.

Since the communication channel is switching as mentioned above, however, a hardware-like instantaneous shut-off time which is required to switch the communication channel (frequency) exists. To reduce such an instantaneous shut-off time, a radio hardware having a high speed synthesizer is used or a plurality of radio units are installed. Such a method results in an increase in costs.

SUMMARY OF THE INVENTION

It is an object of the present invention to solve the problem of the conventional system mentioned above.

Another object of the invention is to improve a communication quality.

Still another object of the invention is to provide a cheap communication system of a high communication quality.

Further another object of the invention is to prevent that the communication is instantaneously shut off when the slave is moved to another area.

Further another object of the invention is to provide a communication system in which after the master that is connected to the slave through either one of a plurality of frequencies was switched, the frequency used before the master is switched is also used after completion of the switching.

Further another object of the invention is to provide a communication system in which either one of a plurality of masters and the slaves can be connected through a plurality of communication channels of different frequencies and each of the plurality of communication channels is time-divided to a plurality of communication channels, wherein the case where the master that is connected to the slave is switched, the same communication channel is used before and after the switching.

The above and other objects and features of the present invention will become apparent from the following detailed description and the appended claims with reference to the accompanying drawings.

BRIEF DESCRIPTION OF THE DRAWINGS

FIG. 7 is an explanatory diagram showing a construction of a slave control memory in the first embodiment;

FIG. 8 is an explanatory diagram showing a construction of a master control memory in the first embodiment;

FIG. 18 is an explanatory diagram showing an example of a communication slot on a communication channel in the second embodiment;

FIGS. 19A, 19B and 19C are explanatory diagrams showing a using situation of the communication slots at the time of hand-over processing in the second embodiment;

FIG. 20 is a flowchart showing the hand-over processing of a radio terminal in the second embodiment;

DETAILED DESCRIPTION OF THE PREFERRED EMBODIMENTS

Figure 1:
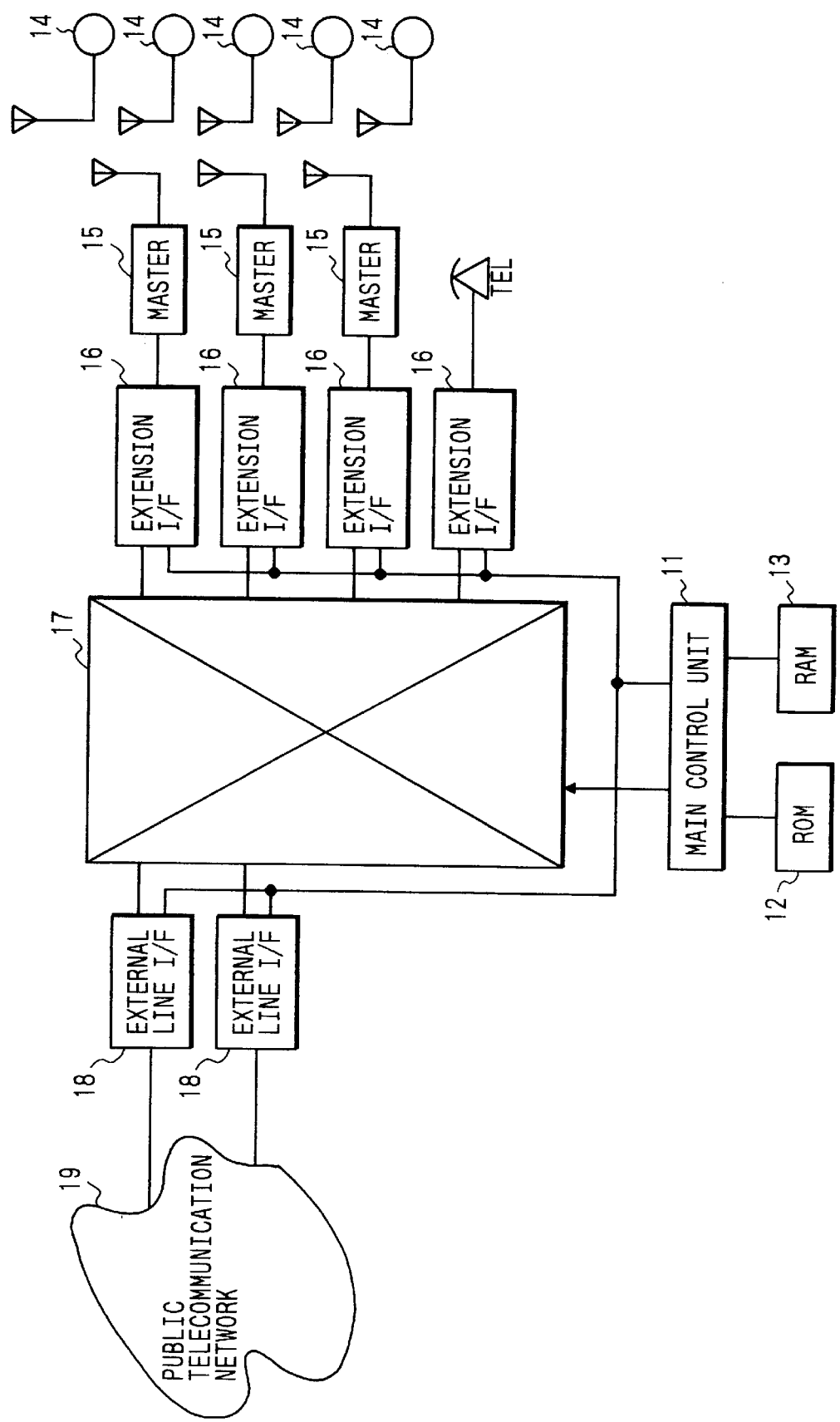
FIG. 1 is a block diagram showing a whole construction of a cordless telephone system in the first embodiment of the invention.

FIG. 1 is a block diagram showing a whole construction of a cordless telephone system in the first embodiment of the invention.

The system of the embodiment comprises:

a main control unit 11 to control the whole system;

an ROM 12 in which machine language codes of a control program have been stored; an RAM 13 in which various kinds of set data and the like have been stored; slaves 14 of cordless telephones which are connected as extension terminals; master 15 of the cordless telephones; extension interfaces 16 of various kinds of extension terminals; an exchange unit 17 comprising time-divisional switches; and external interfaces 18 which are connected to a public telecommunication network 19. As masters 15 and slaves 14 which are connected to the system of the embodiment, the masters and slave which have the confidential speech function and the masters and slaves which don't have the confidential speech function are mixedly enclosed in the system.

Figure 2:
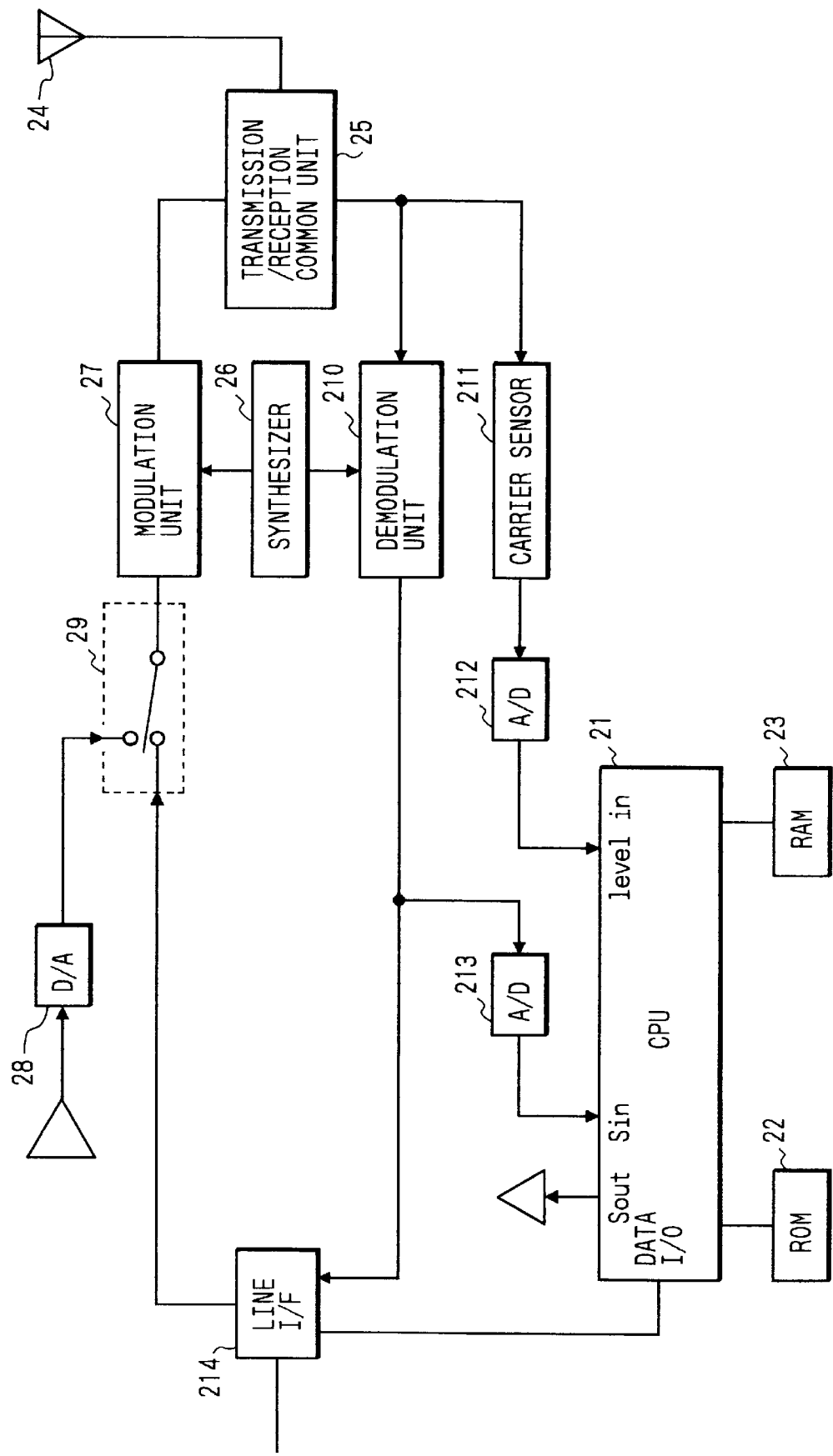
FIG. 2 is a block diagram showing a construction of a master which doesn't have a confidential speech function in the first embodiment.

FIG. 2 is a block diagram showing a construction of the master which doesn't have the confidential speech function in the embodiment.

The master comprises: a control unit (CPU) 21 to perform various kinds of controls; an ROM 22 in which machine language codes of a control program have been stored; an RAM 23 in which various kinds of set data and the like have been stored; an antenna 24; a transmission/reception common unit 25; and a synthesizer 26.

As a construction of a transmission system, the master has: a modulation unit 27 to modulate a signal which is transmitted to the slave; a D/A conversion unit 28 to convert a digital signal in which a control signal that is transmitted from the CPU 21 to the slave and a signal on the line have been scrambled into an analog signal; and a switch 29 to select either one of the mode to send the signal from the CPU 21 to the slave and the mode to transmit the signal (voice of a partner or the like) on the line to the slave.

As a construction of a reception system, the master further has: a demodulation unit 210 to demodulate a radio signal from the slave; a carrier sensor 211 for detecting a radio carrier signal which is sent from the slave and generating the result of the detection by an intensity of a radio carrier; an A/D conversion unit 212 to convert a carrier intensity signal generated from the carrier sensor 211 into a digital signal; and a line interface 214 which is connected to the extension interface by a line.

Figure 3:
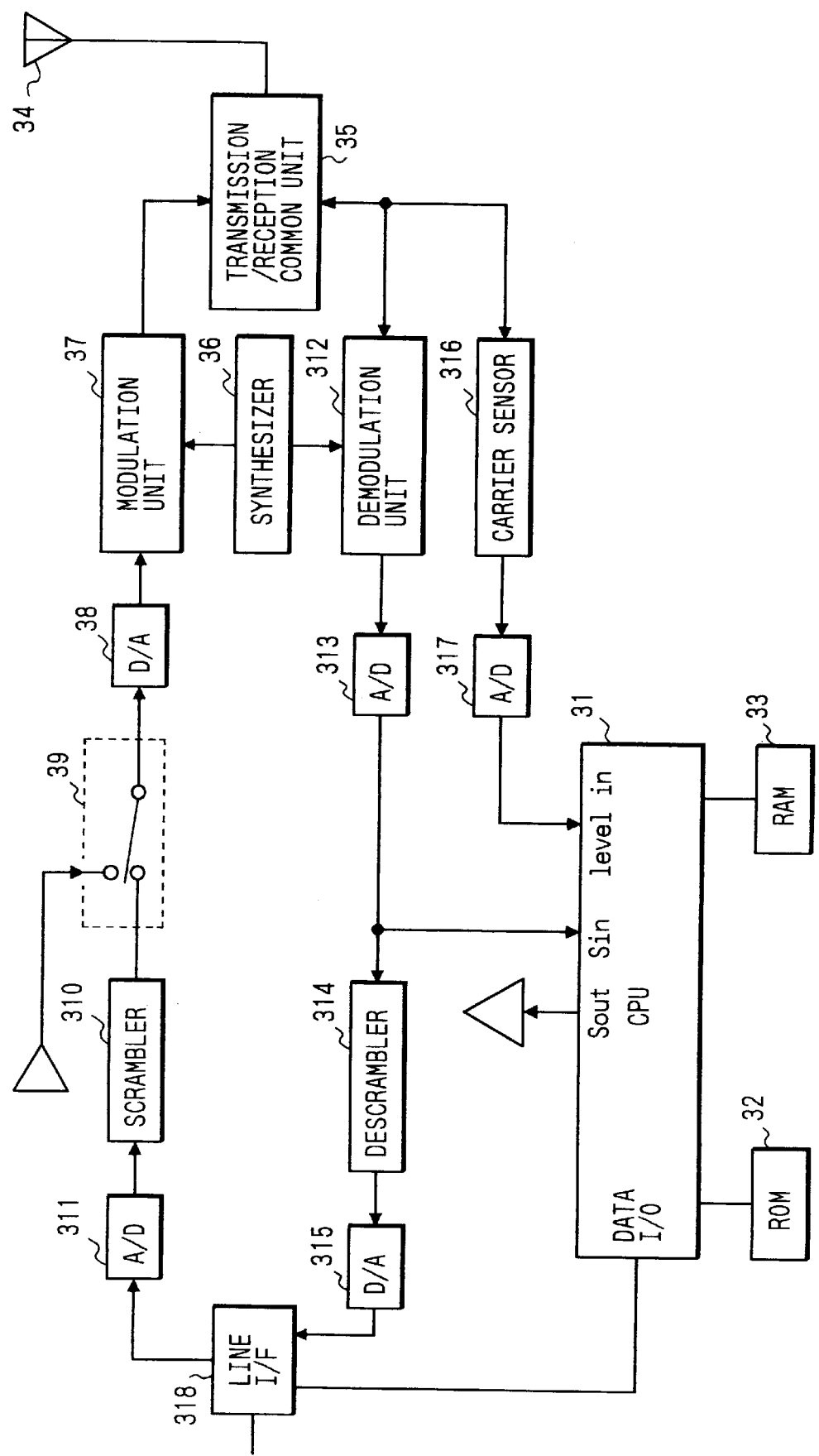
FIG. 3 is a block diagram showing a construction of a master having the confidential speech function in the first embodiment.

FIG. 3 is a block diagram showing a construction of the master having the confidential speech function in the embodiment.

The master comprises: a control unit (CPU) 31 to perform various kinds of controls; an ROM 32 in which machine language codes of a control program have been stored; an RAM 33 in which various kinds of set data and the like have been stored; an antenna 34; a transmission/reception common unit 35; and a synthesizer 36.

As a construction of the transmission system, the master has: a modulation unit 37 to modulate a signal which is transmitted to the slave; a D/A conversion unit 38 to convert a digital signal in which a control signal which is transmitted from the CPU 31 to the slave and a signal on the line have been scrambled into an analog signal; a switch 39 to select either one of the mode to send the signal from the CPU 31 to the slave and the mode to transmit the signal (voice of a partner or the like) on the line; a scrambler 310 for scrambling an input signal and generating; and an A/D conversion unit 311 for converting the analog signal on the line into the digital signal so that it can be processed by the scrambler 310. A scramble pattern of the scrambler 310 can be designated from among a plurality of patterns by the control from the CPU 31. It is also possible that the scrambling process is not executed by the control from the CPU 31.

Further, as a construction of the reception system, the master has: a demodulation unit 312 to demodulate a radio signal from the slave; an A/D conversion unit 313 to convert the analog signal from the slave into the digital signal so as to be descrambled by the CPU 31; a descrambler 314 to return the scrambled signal which was transmitted from the slave to the signal before the scrambling process is executed; a D/A conversion unit 315 for converting the signal which was returned to the original digital signal by the descrambler 314 into the analog signal so as to be generated onto the line; a carrier sensor 316 for detecting a radio carrier signal which is sent from the slave and for generating the result of the detection by an intensity of a radio carrier; an A/D conversion unit 317 to convert a carrier intensity signal generated from the carrier sensor 316 into a digital signal; and a line interface 318 which is connected to the extension interface by the line. A descramble pattern of the descrambler 314 can be designated from among a plurality of patterns by the control from the CPU 31. It is also possible that the descrambling process is not executed by the control from the CPU 31.

Figure 4:
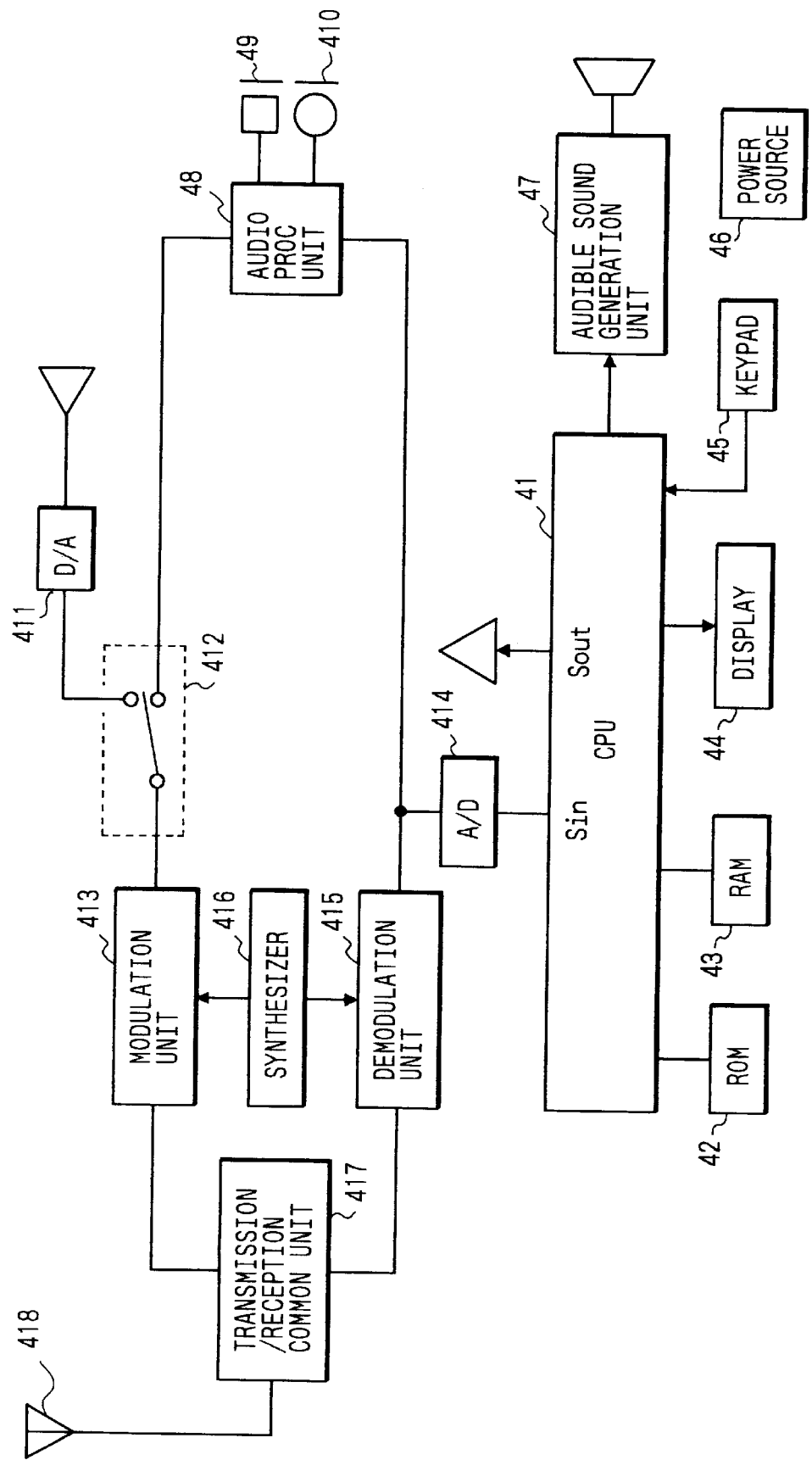
FIG. 4 is a block diagram showing a construction of a slave which doesn't have the confidential speech function in the first embodiment.

FIG. 4 is a block diagram showing a construction of a slave which doesn't have the confidential speech function in the embodiment.

The slave comprises: a control unit (CPU) 41 to execute various kinds of controls; an ROM 42 in which machine language codes of a control program have been stored; an RAM 43 in which various kinds of set data and the like have been stored; a display 44 to display a dot character; a keypad 45 as an input interface of the user; a power source unit 46 of the slave; an audible sound generation unit 47 to generate a warning sound or the like; an audio processing unit 48 which is constructed by a codec and the like; a handset speech reception unit 49; a handset speech transmission unit 410; a synthesizer 416; a transmission/reception common unit 417; and an antenna 418.

As a construction of the transmission system, the slave has: a D/A conversion unit 411 to convert a control signal which is transmitted from the CPU 41 to the master into an analog signal; a switch 412 to select either one of the mode to transmit a voice of the user to the master and the mode to transmit the control signal from the CPU 41; and a modulation unit 413 to modulate the signal which is transmitted to the master into the radio signal.

As a construction of the reception system, further, the slave has: an A/D conversion unit 414 for converting the signal received from the master into the digital signal and for supplying the digital signal to the CPU 41; and a demodulation unit 415 to demodulate a radio signal from the master.

Figure 5:
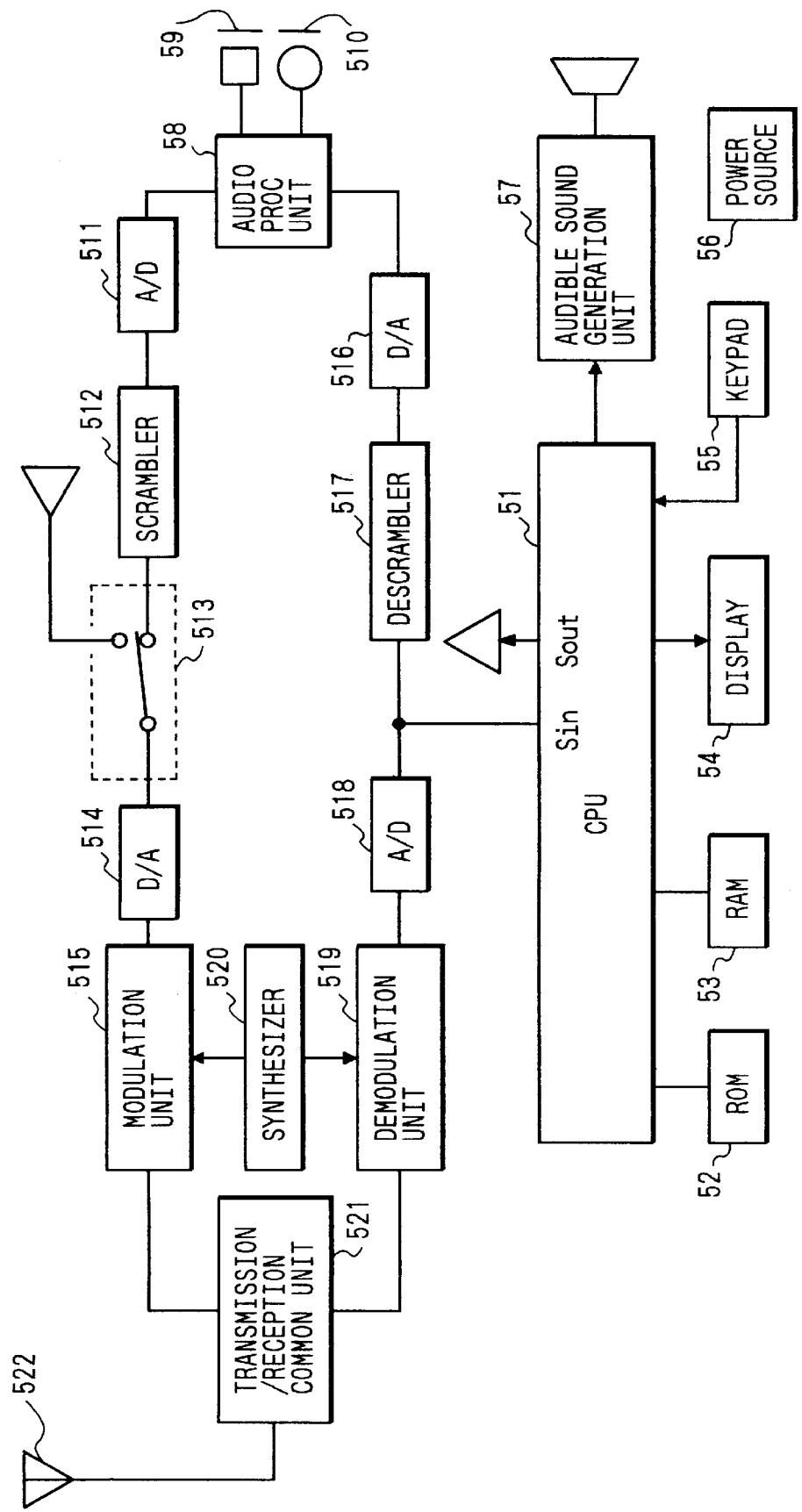
FIG. 5 is a block diagram showing a construction of a slave having the confidential speech function in the first embodiment.

FIG. 5 is a block diagram showing a construction of the slave having the confidential speech function in the embodiment.

The slave has: a control unit (CPU) 51 to execute various kinds of controls; an ROM 52 in which machine language codes of a control program have been stored; an RAM 53 in which various kinds of set data and the like have been stored; a display 54 to display a dot character; a keypad 55 as an input interface of the user; a power source unit 56 of the slave; an audible sound generation unit 57 to generate a warning sound or the like; an audio processing unit 58 which is constructed by a codec and the like; a handset speech reception unit 59; a handset transmission speech unit 510; a synthesizer 520; a transmission/reception common unit 521; and an antenna 522.

As a construction of the transmission system, the slave has: an A/D conversion unit 511 to convert an audio signal from the hand set speech transmission unit 510 into a digital signal which can be scrambled; a scambler 512 to scramble the input digital signal; a switch 513 to select either one of the mode to transmit a voice of the user to the master and the mode to transmit a control signal from the CPU 51; a D/A conversion unit 514 to convert the the control signal that is transmitted from the CPU 51 and the scrambled digital signal into analog signals; and a modulation unit 515 to modulates a signal that is transmitted to the master into a radio signal. A scramble pattern of the scrambler 512 can be designated from among a plurality of patterns by the control from the CPU 51. It is also possible that the scrambling process is not executed by the control from the CPU 51.

As a construction of the reception system, further, the slave has: a D/A conversion unit 516 to convert the digital signal in which the signal received from the master was descrambled into the analog signal; a descrambler 517 to return the scrambled signal transmitted from the master to the signal before the scrambling process is executed; an A/D conversion unit 518 to convert the signal in which the analog signal from the master was descrambled or the control signal from the CPU 51 into the analog signal; and a demodulation unit 519 to demodulate a radio signal from the master. A descramble pattern of the descrambler 517 can be designated from among a plurality of patterns by the control from the CPU 51. It is also possible that the descrambling process is not executed.

Figure 6:
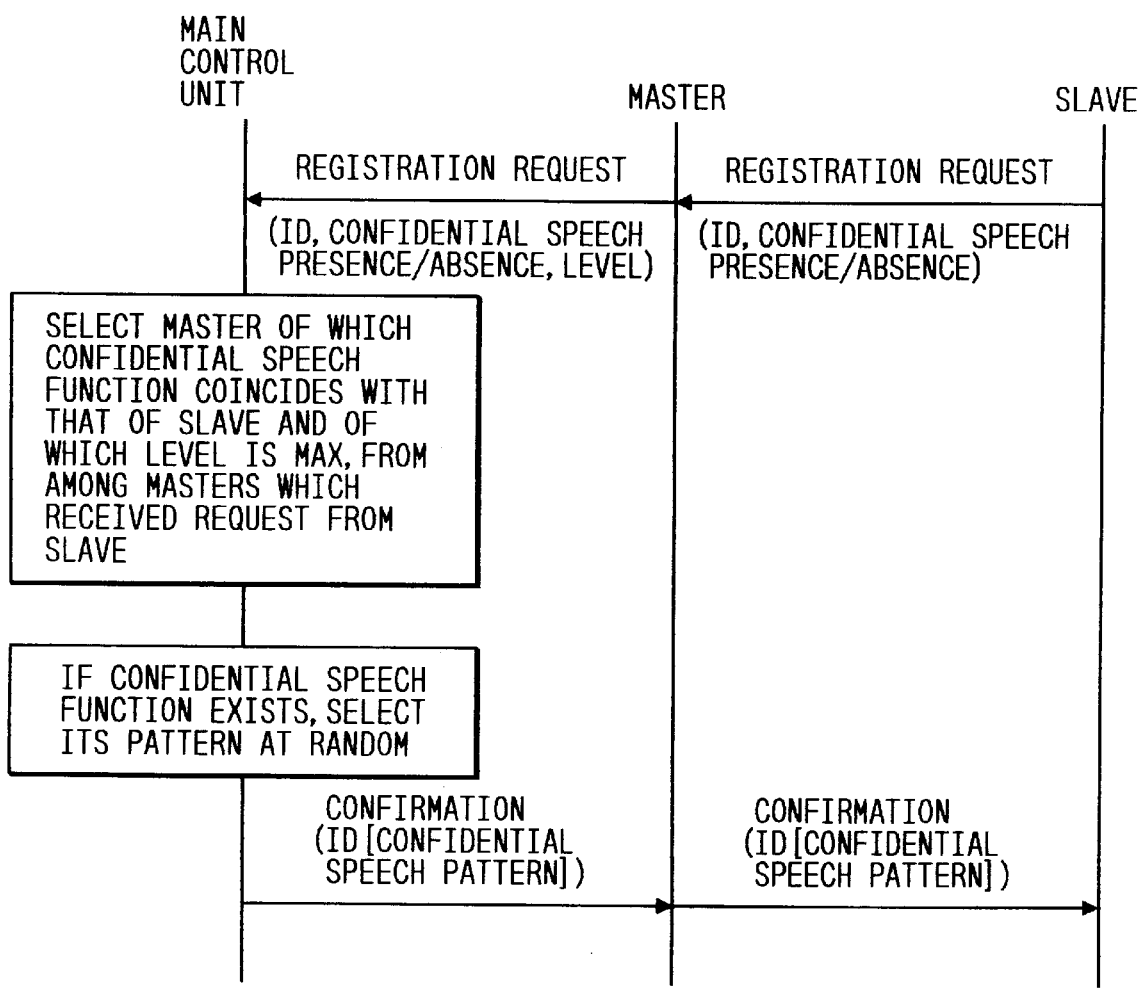
FIG. 6 is a sequence diagram showing a procedure to register the slave to a cordless telephone system in the first embodiment.

FIG. 6 is a sequence diagram showing a procedure to register the slaves in the embodiment into the cordless telephone system. A slave registering procedure in the embodiment will now be described with reference to FIG. 6.

First, when the power source of the slave is activated, if the memory of the slave is in an unregistered state at that time point, the slave generates a registration request signal to an unspecified master. The registration request signal includes an ID of the slave which generate such a request signal and data indicative of the presence or absence of the confidential speech function of the slave.

On the other hand, the master which received the registration request signal gives the received radio wave level to the received content and notifies to the main control unit 11.

When the notifications of the registration request of the slave are received from a plurality of masters, the main control unit 11 registers the received contents into a slave control memory of the RAM 13 and specifies the master which allows the confidential speech function of the slave from among the plurality of masters. Further, one of the masters having the largest reception electric field level is selected from those masters and registered into the slave control memory.

When the slave which generated the registration request has the confidential speech function, one of the confidential speech patterns is selected at random and parameters of the selected pattern are registered into the slave control memory. The main control unit 11 gives the parameters of the selected confidential speech pattern to an ID of the slave which requested a registration confirmation signal and notifies to the slave through the selected master, thereby finishing the registering process.

FIG. 7 is an explanatory diagram showing a construction of the slave control memory of the RAM 13 in the embodiment.

As shown in the diagram, the slave control memory is constructed by areas to store: the ID that is peculiar to the slave; the extension telephone number of the slave; the master which is at present being registered; a flag indicative of the presence or absence of the confidential speech function; the confidential speech pattern registered at present; a flag indicating whether the confidential speech function is being used during communication or not; and the radio channel number which is used during communication.

FIG. 8 is an explanatory diagram showing a construction of a master control memory of the RAM 13 in the embodiment.

As shown in the diagram, the master control memory is constructed by areas to store: the extension telephone number of the master itself; a flag indicative of the presence or absence of the confidential speech function; and a type of acceptable channel. As for the acceptable channel type, a range of the usable channels is set by certain parameters in order to reduce a collision of the used channels or a frequency interference every master. In the embodiment, parameters 1 to 5 are used, all of 80 speech communication channels are divided into five groups, and the parameters are allocated to them in accordance with the order from the small channel number.

Figure 9:
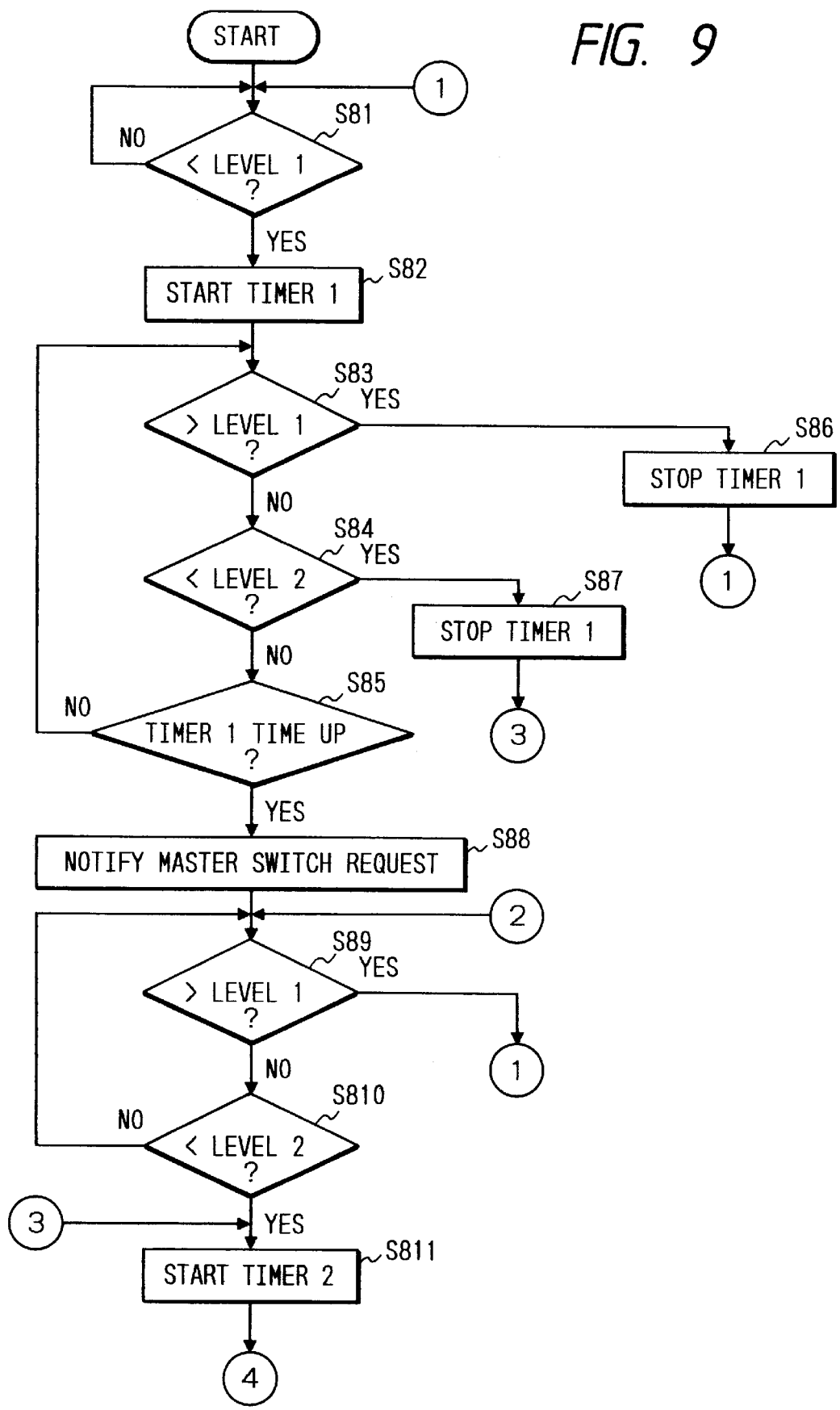
FIG. 9 is a flowchart showing processes in the case where the level corresponds to a radio carrier signal of the slave in the master in the first embodiment.
Figure 10:
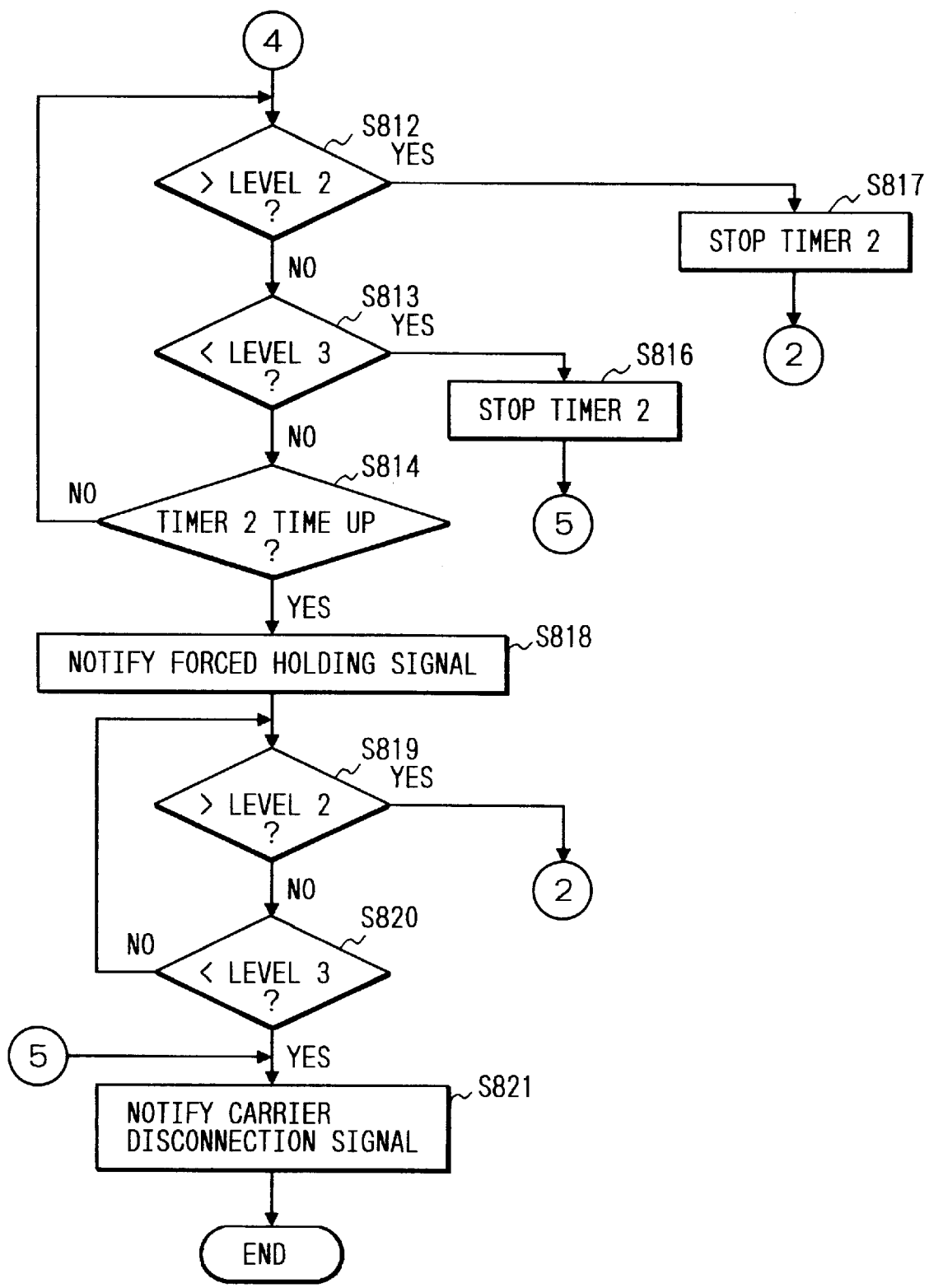
FIG. 10 is a flowchart showing processes in the case where the level corresponds to the radio carrier signal of the slave in the master in the first embodiment.

FIGS. 9 and 10 are flowcharts showing processes in the case where the level corresponds to the radio carrier signal of the slave in the master of the embodiment. Processes of the CPUs 21 and 31 of the master regarding a change in reception electric field intensity level from the slave during communication will now be described with reference to FIGS. 9 and 10.

Hereinafter, it is assumed that levels 1, 2, and 3 are defined as reception electric field intensity levels and that the reception electric field intensity at level 2 is weaker than that at level 1 and the reception electric field intensity at level 3 is weaker than that at level 2.

First, when it is detected that the reception electric field intensity levels from the carrier sensors 211 and 316 are lowered than the level 1 during communication (S81), a timer 1 is started (S82) and the apparatus waits until the reception intensity exceeds the level 1 (S83) is lower than the level 2 (S84) or the timer 1 times out (S85).

In step S83, when it is detected that the reception electric field intensity exceeds the level 1, the timer 1 is stopped (S86) and the processing routine is returned to the ordinary state.

In step S84, when the reception electric field is lower than the level 2, the timer 1 is stopped (S87) and the processing routine advances to the process (S811 and subsequent steps) of the next state.

In step S85, when the timer 1 has timed up, a master switching request signal is notified to the main control unit 11 (S88) and the apparatus waits until the reception electric field intensity exceeds the level 1 (S89) or is lower than the level 2 (S819).

In step S89, when it is detected that the reception electric field intensity exceeds the level 1, the processing routine is returned to the ordinary state (S81).

In step S810, when it is detected that the reception electric field intensity is lower than the level 2, the timer 2 is started (S811). The apparatus waits until the reception intensity exceeds the level 2 (S812) or is lower than the level 3 (S813) or the timer 2 times up (S814).

In step S812, when it is detected that the reception electric field intensity exceeds the level 2, the timer 2 is stopped (S817) and the processes in step S89 and subsequent steps are continued.

In step S813, when it is detected that the reception electric field intensity is lower than the level 3, the timer 2 is stopped (S816), a carrier disconnection signal is notified to the main control unit 11 (S821), and the processing routine is finished.

In step S814, when it is detected that the timer 2 has timed up, further, a forced holding signal is notified to the main control unit 11 (S818) and the apparatus waits until the reception electric field intensity exceeds the level 2 (S819) or is lower than the level 3 (S820).

In step S819, when it is detected that the reception electric field intensity exceeds the level. 2, the processes in step S89 and subsequent steps are continued.

In step S820, when the reception electric field intensity is lower than the level 3, the carrier disconnection signal is notified to the main control unit 11 (S821) and the processing routine is finished.

Figure 11:
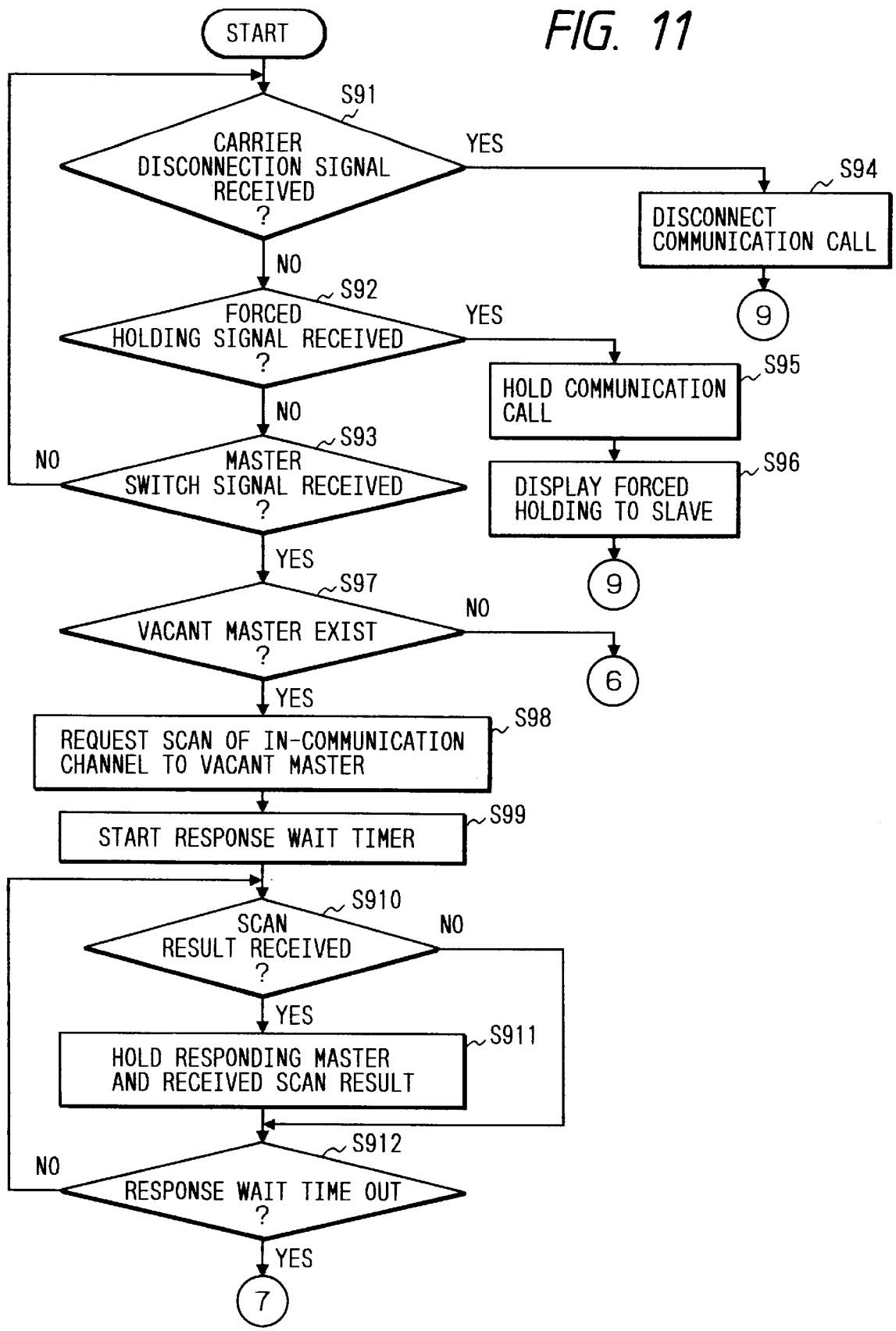
FIG. 11 is a flowchart showing processes in a main control unit in the first embodiment.
Figure 12:
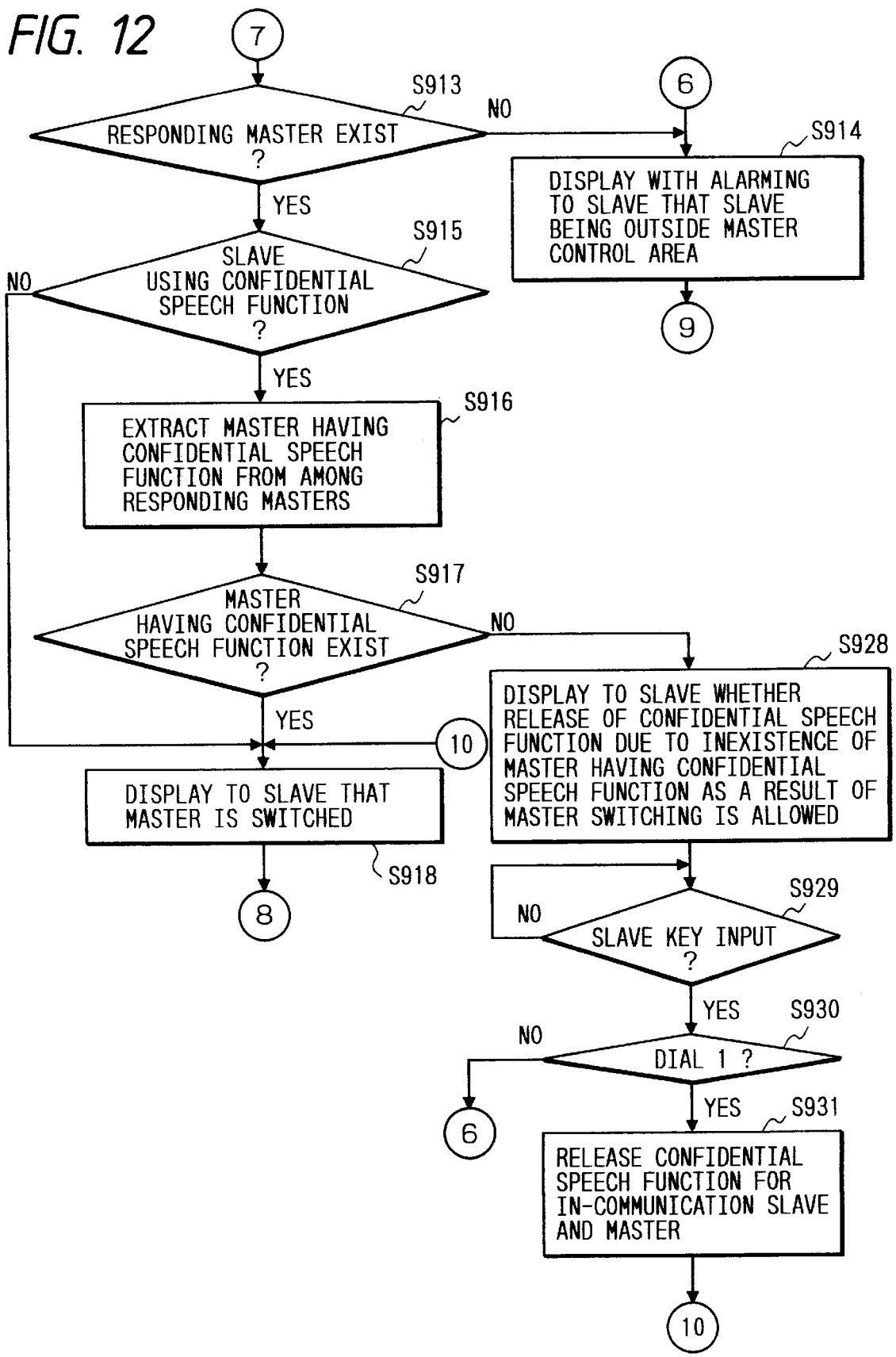
FIG. 12 is a flowchart showing processes in the main control section in the first embodiment.
Figure 13:
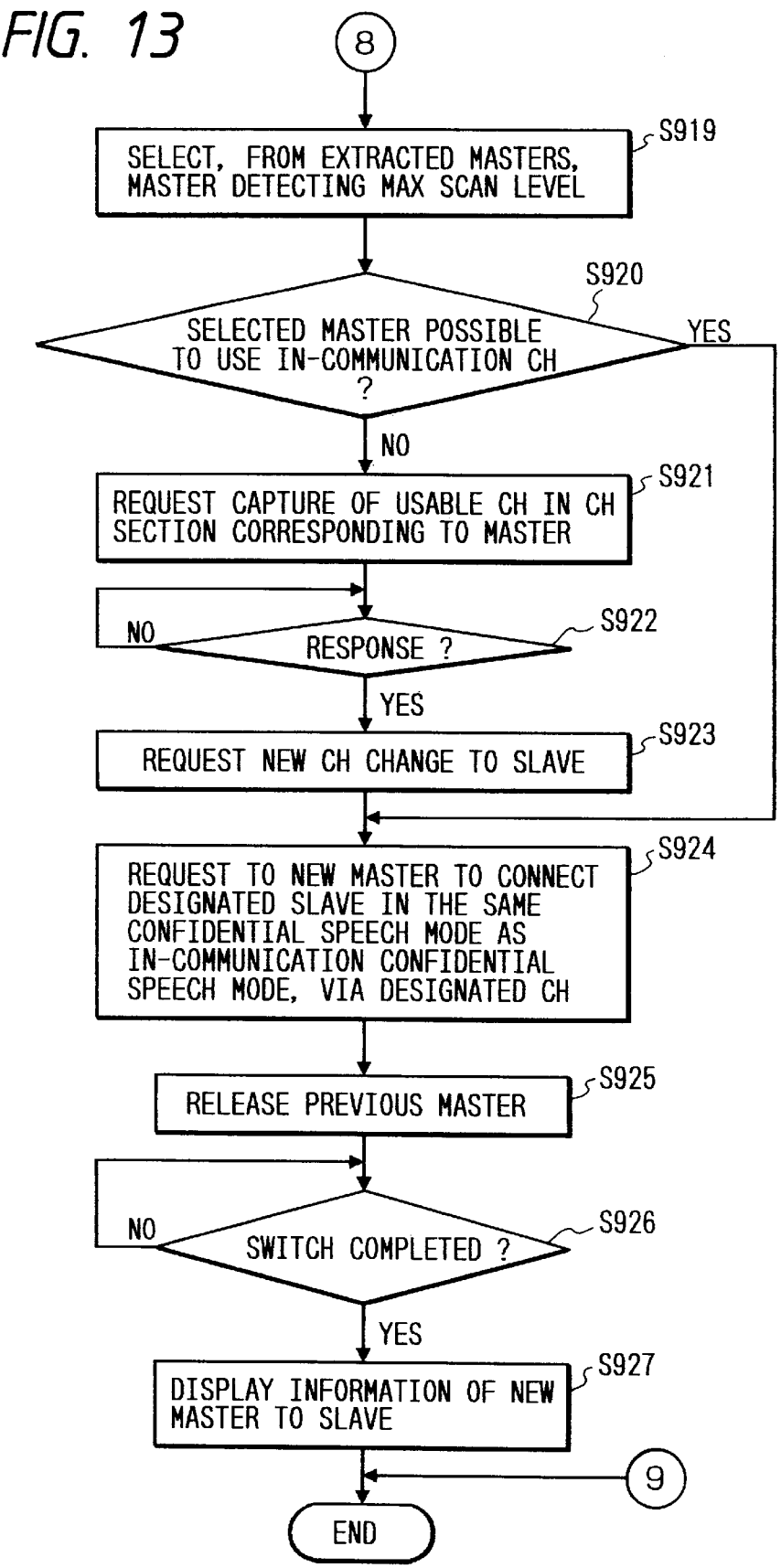
FIG. 13 is a flowchart showing processes in the main control section in the first embodiment.

FIGS. 11 to 13 are flowcharts showing processes in the main control unit 11 of the embodiment. The processes of the main control unit 11 will now be described with reference to FIGS. 11 to 13.

While the extension of the cordless telephone is communicating, the main control unit 11 waits for the reception of the carrier disconnection signal of the slave, forced holding signal, or master switching signal form the master to which the slave is connected (S91 to S93).

In step S91, when the carrier disconnection signal is received, a communication call is disconnected (S94) and the processing routine is finished.

In step S92, when the forced holding signal is received, the communication call is held (S95) and a command is given to the communicating slave through the corresponding master so as to display a message indicating that the communication call was forcedly held (S96). The processing routine is finished.

Further, in step S93, when the master switching signal is received, a check is made to see if there is a vacant master or not (S97). When some vacant masters exist, a scan request of the current channel in-communication held in the slave control memory of the slave which is at present communicating is generated to all of the vacant masters (S98). A response wait timer is started (S99). Before the response wait timer times out (S912), when the scan result is received from the master which generated the scan request (S910), the responding master and the received scan result are held (S911).

In step S912, when the response wait timer times out, a check is made to see if there is a master which responded to the scan request generated or not (S913). When there is a responding master, a check is made to see if there is a speech communication using the confidential speech function from the slave control memory of the slave in-communication or not (S915). When it is known that the confidential speech function is being used, the master having the confidential speech function is selected from among the masters which returned the responses (S916). A check is made to see if the master having the confidential speech function exists or not (S917).

When it is confirmed in step S915 that the slave in-communication doesn't use the confidential speech function, or when the master having the confidential speech function is found out in step S917, a command is given to the slave through the master connected to the slave so as to display a message indicating that the master is switched (S918). The master which returned the response or one of the masters of which the maximum scan level was detected is selected from among the selected masters (S919).

A check is made to see if the acceptable channel type of the selected master allows the channel in-communication or not on the basis of the slave control memory and the master control memory (S920). When it is judged that it is unacceptable, a request is sent to the selected master so as to capture the usable channel in the channels of the acceptable channel type (S921). When a response confirmation for such a request is received from the selected master together with a new captured channel number (S922), a request to change the speech channel to the newly captured channel is sent to the slave in-communication through the master which is at present communicating (S923).

When it is detected in step S920 that the present used channel is accepted to the acceptable channel type of the selected master, or after completion of the changing process of the speech communication channel in step S923, a request is sent to the newly selected master so as to perform a radio connection to the slave designated through the designated channel in the same confidential speech mode (mode which doesn't use the confidential speech function if the confidential speech function is not used) as the confidential speech mode during speech communication (S924). The before-switching master which was communicating is released (S925).

When the completion of the switching of the connection with the slave is notified from the newly selected master (S926), information of the new master is displayed to the slave in-communication through the newly selected master (S927). The processing routine is finished.

When it is confirmed that there is no vacant master in step S97 or when there is no responding master in step S913, a warning indicating that the slave is out of the control area of the master is displayed to the slave in-communication through the current master (S914). The processing routine is finished.

Further, in step S917, when it is confirmed that there is no master having the confidential speech function, for example, "confidential speech release OK (1) or NO (any) ?" is displayed to the slave in-communication and whether the master switching by the confidential speech release is accepted or not is inquired to the slave (S928). Therefore, the user of the slave performs the key input (S929). The input key is checked (S930). When the input key is out of the dial 1, the processes in step S914 and subsequent steps are executed. When the input key indicates the dial 1, a command is given to the slave in-communication through the current master so as to release the confidential speech function of the slave in-communication and the confidential speech function of the master in-communication is released (S931). The processes in step S918 and subsequent steps are continued.

As mentioned above, when the master is switched, during the communication by the confidential speech function, the confidential speech state is held and can be switched as much as possible.

Hitherto, in the case where the intensity of radio signal which is received on the master side decreases during communication, such a state is merely warned to the slave by a beep sound or the like. However, as in the above embodiment, by executing a process such that the master switching request is automatically generated or the signal is forcedly held in accordance with the reception intensity level recognized on the master side or, further, the carrier disconnection signal of the slave is notified to the main control unit 11, or the like, the apparatus can more effectively cope with such a sitaution.

In another embodiment of the invention, the master is not switched in the case where when there is no master having the confidential speech function in step S917, by soon executing the processes in step S914 and subsequent steps, the user intends to switch the master during communication using the confidential speech function and the master having the confidential speech function doesn't exist.

On the other hand, it is also possible to construct so as to automatically release the confidential speech function in the case where when the master having the confidential speech function doesn't exist in step S917, by soon executing the processes in step S931 and subsequent steps and by giving a warning indicative of the release of the confidential speech to the slave in-communication, the user intends to switch the master during communication using the confidential speech function and the master having the confidential speech function doesn't exist.

The second embodiment of the invention will now be described.

The second embodiment relates to a digital cordless telephone system of the TDMA (time-division multi-dimensional connection) system in which one speech communication channel time-divisionally has a plurality of speech communication paths.

Figure 14:
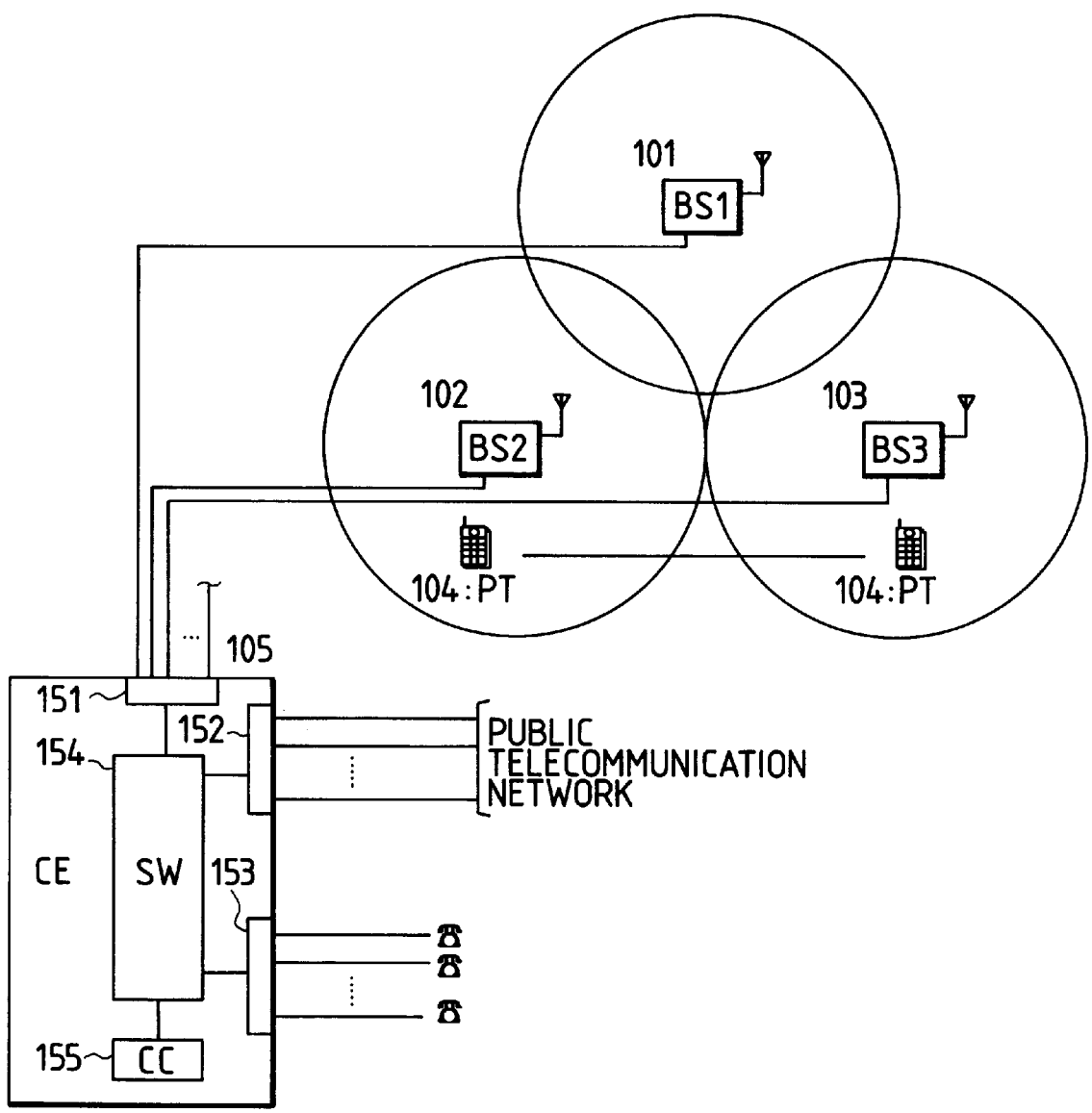
FIG. 14 is a block diagram showing a system to execute processes according to the second embodiment of the invention.

FIG. 14 is a block diagram showing a system for executing processes in the embodiment.

In FIG. 14, reference numerals 101 to 103 denote radio stations (BS1 to BS3); 104 a radio terminal (PT); and 105 a communication control apparatus (CE). FIG. 14 relates to an example in the case where hand-over processes from BS3 to BS2 which are caused due to the movement during the speech communication of PT.

The communication control apparatus CE has: the radio stations BS1 to BS3; a public telecommunication network; interfaces 151, 152, and 153 to enclose telephones; a change-over switch (SW) 154; and a central control unit (CC) 155. The CC 155 has a memory to store a control program, various kinds of set data, and the like.

Figure 15:
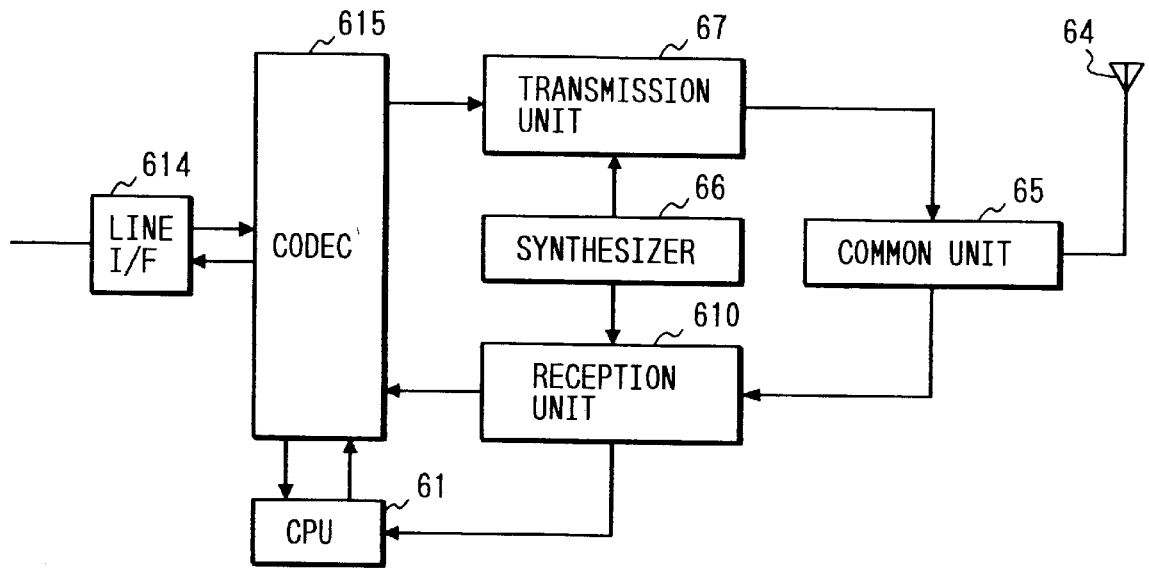
FIG. 15 is a sequence chart showing the operation in the second embodiment.

FIG. 15 is a block diagram showing a construction of the radio station BS in the embodiment.

The radio station BS comprises: a CPU 61 having a memory to store the control program, various kinds of set data, and the like; an antenna 64; a transmission/reception common unit 65; a synthesizer 66; a transmission unit 67; a reception unit 610; a line interface 614; and a codec 615.

The transmission unit 67 executes a down conversion, a demodulation, and the like. The reception unit 610 executes a QPSK encoding, an orthogonal modulation, an up conversion, an electric power amplification, and the like. The line interface 614 performs a communication with the communication control apparatus CE. The codec 615 includes an ADPCM codec and the like. A reception electric field intensity signal is supplied from the reception unit 610 to the CPU 61.

Figure 16:
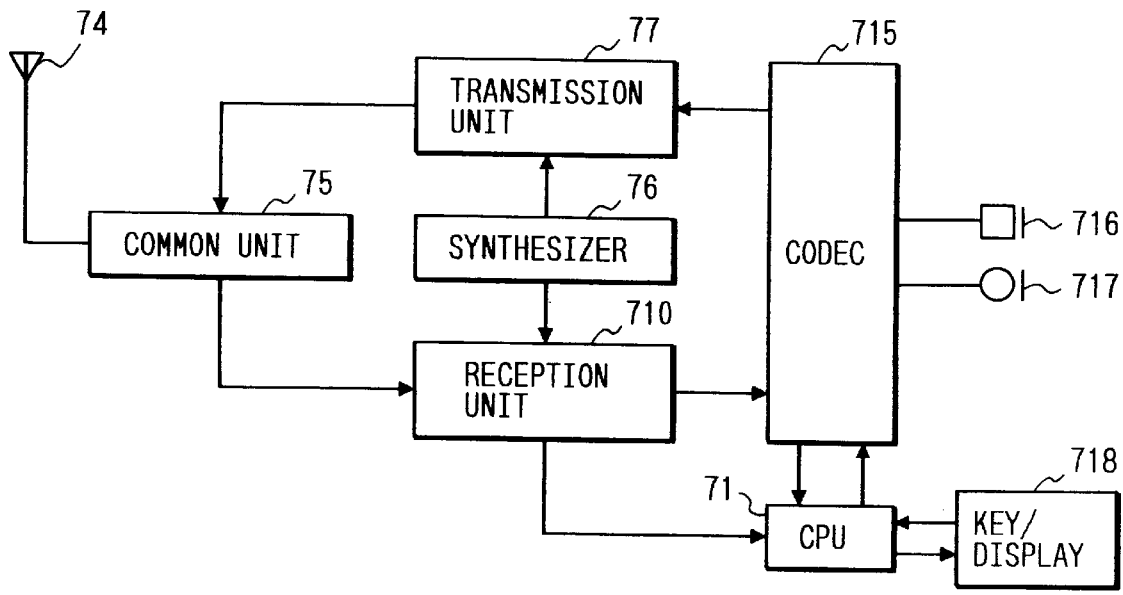
FIG. 16 is a block diagram showing a construction of a radio station in the second embodiment.

FIG. 16 is a block diagram showing a construction of a radio terminal PT in the embodiment.

The radio terminal PT comprises: a CPU 71 having a memory to store a control program, various kinds of set data, and the like; an antenna 74; a transmission/reception common unit 75; a synthesizer 76; a transmission unit 77; a reception unit 710; a codec 715; a microphone 716; a speaker 717; and a key/display 718.

The transmission unit 77 executes a down conversion, a demodulation, and the like. The reception unit 710 executes a QPSK encoding, an orthogonal modulation, an up conversion, an electric power amplification, and the like. The codec 715 includes an ADPCM codec and the like. A reception electric field intensity signal is supplied from the reception unit 710 to the CPU 71.

In the embodiment, since the same frequency is used for upward and downward signal transmission, the transmission/reception common units 65 and 75 are not always necessary.

Figure 17B:
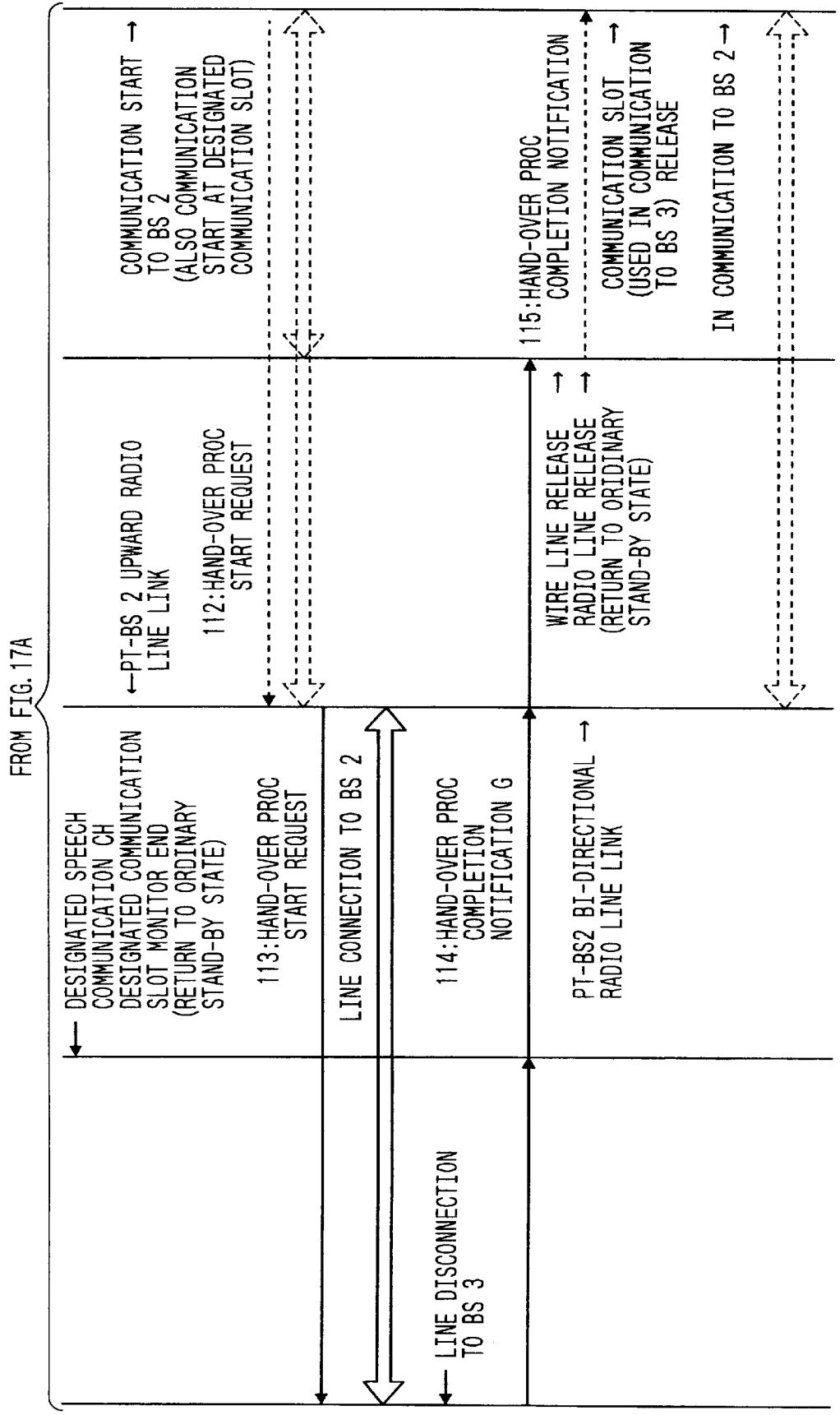
FIG. 17 is comprised of FIGS. 17A and 17B block diagrams showing a construction of radio terminals in the second embodiment.

FIGS. 17A and 17B are explanatory diagrams showing an example of time-division communication slots on the communication channels in a digital cordless telephone system (in case of personal handy phone: PHP) of the TDMA system.

In FIG. 18, reference numeral 301 denotes a used slot of a downward signal (BS→PT) and 302 indicates a used slot and an upward signal (BS←PT). There is shown a use example of a communication slot of the personal handy phone (PHP) of which the timing is synchronized while setting a link channel allocation message 300 to a reference by using the slot (in this case, first slot) that is designated by the message 300.

FIG. 16 is a sequence chart showing the operation of the embodiment. FIGS. 19A to 19C are explanatory diagrams showing a using situation of the communication slots upon hand-over processing in the embodiment.

The radio station BS and the radio terminal PT are connected through 70 speech communication channels (having different frequencies).

Figure 21:
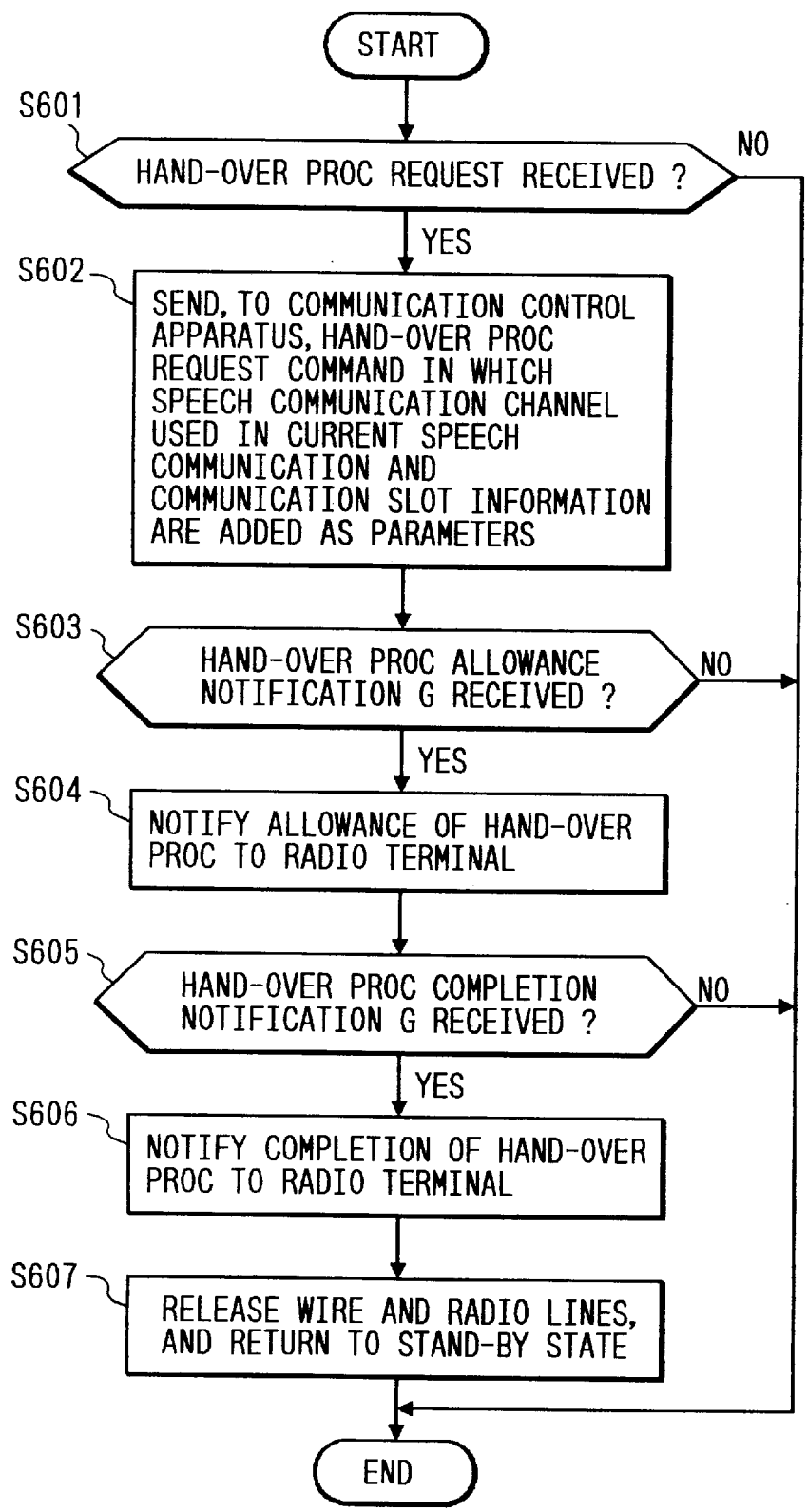
FIG. 21 is a flowchart showing the hand-over processing of the radio station in the second embodiment.
Figure 22:
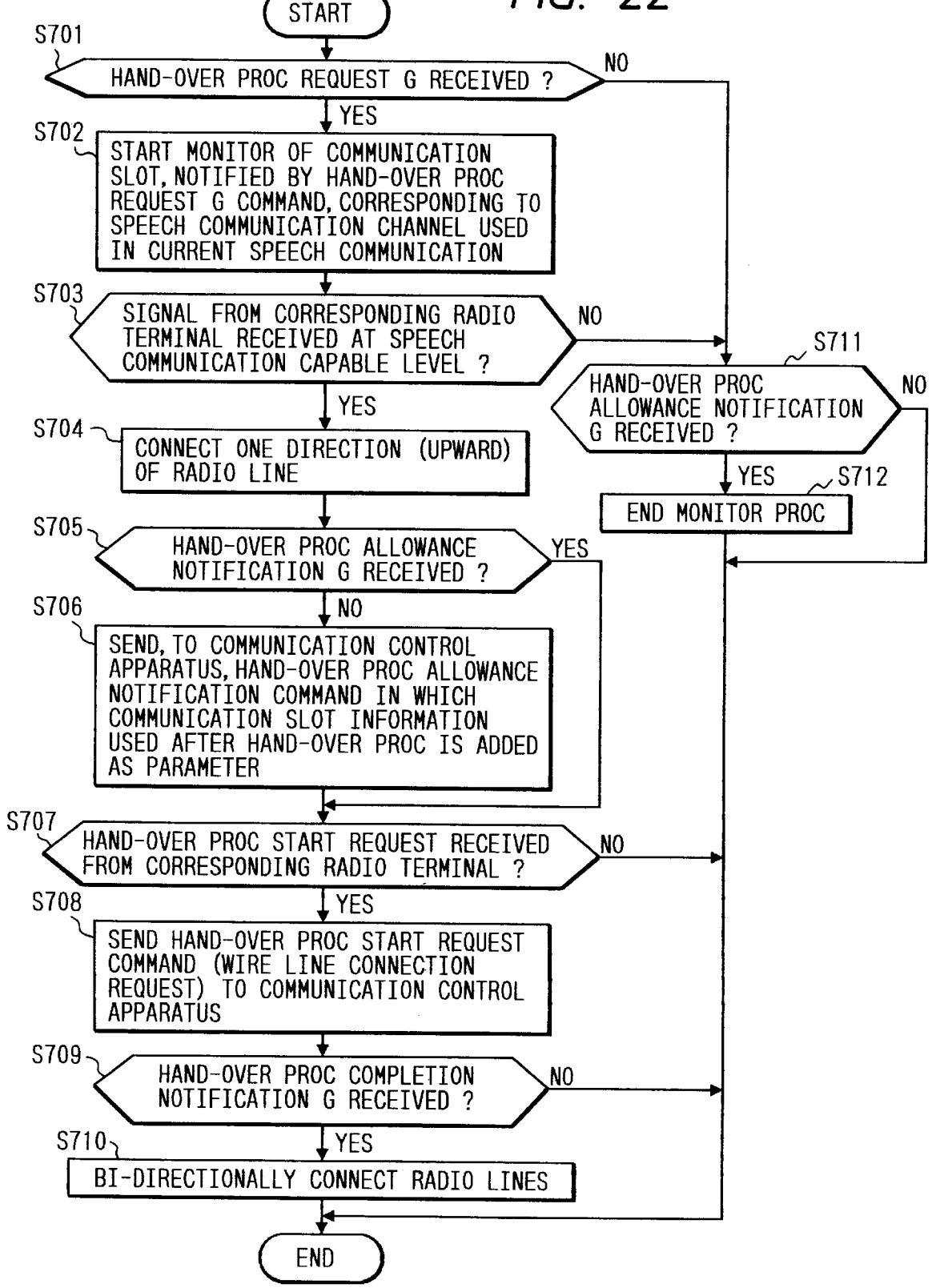
FIG. 22 is a flowchart showing the hand-over processing of the radio station in the second embodiment.
Figure 23:
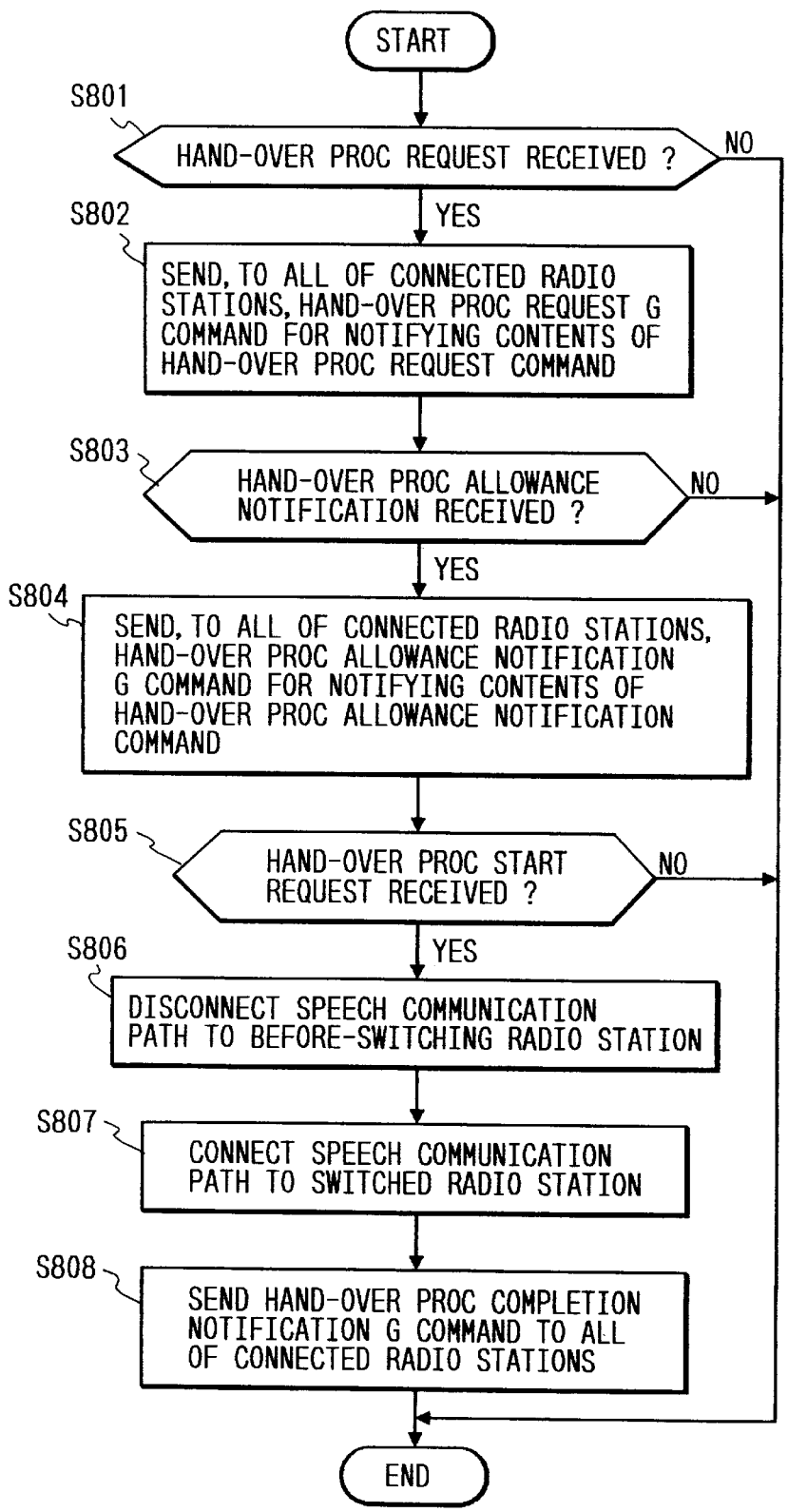
FIG. 23 is a flowchart showing the hand-over processing of a communication control apparatus in the second embodiment.

Further, FIG. 20 is a flowchart showing a hand-over processing of the radio terminal PT. FIG. 21 is a flowchart showing the hand-over processing of the (before-switching) radio station. FIG. 22 is a flowchart showing the hand-over processing of the (switched) radio station. FIG. 23 is a flowchart showing the hand-over processing of the communication control apparatus.

The operation of the embodiment will now be described with reference to the sequence charts of FIGS. 17A and 17B, the used slot state diagrams of FIGS. 19A to 19C, and the flowcharts of FIGS. 20 to 23.

In the speech communication between PT and BS3, the speech communication is being executed at first by using the second communication slot (99 and 100 in FIG. 17A and 401 to 403 in FIG. 19A).

As the PT is away from the BS3, the speech electric field intensity decreases and the CPU 71 of the PT sends a hand-over processing request 106 (FIG. 17A) to the BS3 through the codec 715 and the transmission unit 77 by using the decrease in speech electric field intensity signal of the reception unit 710 as a trigger (S501, S502 in FIG. 20).

The CPU 61 of the BS3 receives the hand-over processing request 106 through the reception unit 610 and the codec 615 and sends a hand-over processing request message 107 (FIG. 17A) to which the speech communication channel which is at present performing the speech communication and the communication slot information were added as parameters to the CE through the line interface 614 (S601, S602 in FIG. 21).

The CC 155 of the CE receives the hand-over processing request message 107 and transmits its content to all of the connected BSs (BS1 and BS2 other than BS3) by a hand-over processing request G message 108 (FIG. 17A) (S801 and S802 in FIG. 23).

The CPU 61 of each of the BS1 and BS2 allows the reception unit 610 to start to monitor the radio wave from the PT by the speech channel and speech slot which were designated by the parameter contents of the hand-over processing request G message 108 received from the line interface 614 (S701, S702 in FIG. 22).

The CPU 61 of the BS2 performs the one-direction connection (to match the timing of the self reception slot with the slot which is transmitted from the PT) of the radio line when the electric field intensity of the signal from the PT which was received by the reception unit 610 is at the speech communication capable level and transmits a hand-over allowance notification 109 (FIG. 17A) from the communication interface 614 to the CE, in which the communication slot information (slot 3 in FIGS. 19A to 19C) that is used after the self information (BS2) had been hand-overed as hand-over switched information was added as parameters (S703 to S706 in FIG. 22).

The CPU 61 of the BS2 selects the communication slot that is used after completion of the hand-over from the same speech channel (frequency) as the speech channel before the hand-over.

The CC 155 of the CE receives the hand-over allowance notification message 109 and transmits its content to all of the connected BS (BS1, BS2, BS3) by a hand-over allowance notification G message 110 (FIG. 17A) (S803, S804 in FIG. 23).

The CPU 61 of the BS1 receives the hand-over allowance notification G message 110 from the line interface 614 in a state in which the signal from the corresponding PT cannot be received at a speech communication capable level by the reception unit 610 and recognizes that the CE enters the hand-over processing with the BS other than the self BS and finishes the monitoring process of the speech channel (S703, S711, S712 in FIG. 22).

The CPU 61 of the BS3 receives the hand-over allowance notification G message 110 from the line interface 614 and recognizes that the switched destination and the communication slot which is used after completion of the switching were determined by the hand-over processing, and the CPU 61 notifies a hand-over allowance notification 111 (FIG. 17A) including the BS information (BS2) of the switch BS and the information (slot 3) of the communication slot to the PT from the transmission unit 67 (S603, S604 in FIG. 21).

The CPU 71 of the PT receives the hand-over allowance notification 111 from the reception unit 710 and recognizes that the hand-over switched destination is the BS2 and the switched slot is the third slot, and the CPU 71 starts the transmission using the third slot and sends a hand-over start request 112 (FIG. 17B) to the BS2 by using the second slot (S503 to S505 in FIG. 20).

As for a communication slot situation at this time point, a bi-directional communication between the PT and the BS3 is executed by using the second slot and a uni-directional communication from the PT to the BS2 is performed by using the third slot (404 to 406 in FIG. 19B).

The CPU 61 of the BS2 receives the hand-over start request 112 by the second slot and starts the reception of the third slot (uni-directional communication information from the PT) and transmits a hand-over start request message 113 (FIG. 17B) to the CE from the line interface 614 (S707, S708 in FIG. 22).

The CC of the CE receives the hand-over start request message 113 and switches the switch 154 so as to disconnect the BS3 (before-switching BS) from the speech communication destination, and the CC newly connects the BS2 (switched BS) to the speech communication destination and transmits a hand-over completion notification G message 114 (FIG. 17B) to all of the connected BS (BS1, BS2, BS3) (S805 to S808 in FIG. 23).

The CPU 61 of the BS2 receives the hand-over completion notification G message 114 from the line interface 614 and recognizes that the switching operation of the speech path regarding the hand-over has been completed, and the CPU 61 subsequently starts the transmission using the third slot from the transmission unit 67 and starts the bi-directional connection sequence of the radio line by the third slot (S709, S710 in FIG. 22). The CPU 61 of the BS3 receives the hand-over completion notification G message 114 from the line interface 614 and transmits a hand-over completion notification 115 (FIG. 17B) to notify the completion of the hand-over from the transmission unit 67 to the PT and releases the wire and radio lines (S606, S607 in FIG. 21).

The CPU 71 of the PT receives the hand-over completion notification 115 from the reception unit 710 and recognizes the completion of the switching operation of the BS regarding the hand-over, and the CPU 71 releases the second slot which is communicating with the BS3 (before-switching BS) and switches the third slot which is performing the upward (BS2←PT) communication with the BS2 to the bi-directional communication (BS2←→PT), thereby completing the hand-over processing (S507, S508 in FIG. 20).

As for a communication slot situation at the final stage, the bi-directional communication between the PT and the BS3 is executed by using the third slot (407 to 409 in FIG. 19C).

In the digital cordless telephone system using the time-division multi-dimensional connection system as mentioned above, the hand-over processing using the same speech channel (frequency) can be realized. The radio line disconnection for a long time which is required for switching the hand-over processing using different speech channels can be avoided without raising the costs of the hardware of the radio system.

In the above second embodiment, the trigger of the hand-over processing has automatically been executed by using the reduction of the electric field intensity of the radio telephone terminal. However, such a trigger can be also realized by a switching operation of the user or by outputting a signal to a movement detection sensor and a similar effect is also obtained by such a method.

Although the above second embodiment has been described with regard to the system in which the upward frequency and the downward frequency are common, the invention can be also applied to a system in which the upward frequency and the downward frequency are different. It is also possible to construct in a manner such that the communication slots before and after the hand-over are not changed.

In the first and second embodiments, when the reception electric field intensity level decreases at the slave or radio terminal, the switching of the master or the hand-over is executed. However, the switching of the master or the hand-over can be also performed in accordance with the reception electric field intensity level at the master.

Although the invention has been described with regard to the preferred embodiments, the invention is not limited to the foregoing embodiments but many modifications and variations are possible within the spirit and scope of the appended claims of the invention.

What is claimed is:

1. A communication system for switching a connection destination of a slave from a first master to a second master, wherein:

said first master connects a first upward link from said slave by using a first time slot on one of a plurality of frequencies;

said slave transmits a switch signal when said slave detects that a reception level at said slave is less than a predetermined level;

said first master informs said slave of a second time slot on said one of the plurality of frequencies used for connection between said first master and said slave;

said first master disconnects the first upward link from said slave; and said second master connects a second upward link from said slave, without connecting a downward link to said slave, in response to the switch signal received by said first master and a first upward link signal received by said second master, by using the second time slot, before said first master disconnects the first upward link from said slave, wherein said second master is informed by said first master in response to the switch signal about said one of the plurality of frequencies used for connection between said first master and said slave, and the first upward link and the second upward link are used for speech communication.

2. A system according to claim 1, wherein said second master connects said slave based on a request by said first master.

3. A system according to claim 4, wherein said first or second master and the slave are connected through a radio channel.

4. A communication system in which a slave is connected to first and second masters by using one of a plurality of frequencies, wherein:

said slave connects a first upward link to said first master by using a first time slot on the one of the plurality of frequencies;

said first master informs said slave of a second time slot on the one of the plurality of frequencies;

said slave disconnects the first upward link to said first master; and said slave connects a second upward link to said second master by using the second time slot, without connecting a downward link from said second master, in a state where said slave is still connected to said first master via the first upward link, in accordance with a first upward link signal received by said second master;

wherein the first upward link and the second upward link are used for speech communication.

5. A system according to claim 4, wherein said slave uses the first upward link for transmission to said first master and the second upward link for transmission to said second master.

6. A system according to claim 4, wherein said second master connects the downward link to said slave by using a time slot on the one of the plurality of frequencies, after said slave connects the second upward link to said second master, wherein a downward signal from said second master to said slave is transmitted via the time slot shifted from the second time slot by a predetermined number of time slots.

7. A control method for controlling a communication system in which a slave is connected to first and second masters by using one of the plurality of frequencies, wherein:

connecting said slave and first upward link to said first master by using a first time slot on the one of the plurality of frequencies;

informing said slave by said first master of a second time slot on the one of the plurality of frequencies;

disconnecting said slave and the first upward link to said first master; and connecting said slave and a second upward link to said second master by using the second time slot, without connecting a downward link from said second master, in a state where said slave is still connected to said first master via the first upward link, in accordance with a first upward link signal received by said second master;

wherein the first upward link and the second upward link are used for speech communication.

8. A method according to claim 7, wherein the first upward link is used by said slave for transmission to said first master and the second upward link is used for transmission to said second master.

9. A method according to claim 7, further comprising a step of connecting said second master and a second downward link to said slave by using a time slot on the one of the plurality of frequencies, after said slave connects the second upward link to said second master, wherein a downward signal from said second master to said slave is transmitted via the time slot shifted from the second time slot by a predetermined number of time slots.

10. A communication apparatus comprising:

connecting means for connecting a first upward link to a first master by using a first time slot on the one of a plurality of frequencies;

receiving means for receiving a signal from said first master indicating a second time slot on the one of the plurality of frequencies; and control means for controlling said connecting means such that the first upward link to said first master is disconnected, wherein said control means controls said connecting means such that a second upward link to a second master is connected by using the second time slot, without connecting a downward link from said second master, in a state where the first upward link to said first master is still connected, in accordance with a first upward link signal received by said second master;

wherein the first upward link and the second upward link are used for speech communication.

11. An apparatus according to claim 10, wherein the first upward link is used for transmission to said first master and the second upward link is used for transmission to said second master.

12. An apparatus according to claim 10, wherein said control means controls said connecting means such that a second downward link to said slave is connected by using a time slot on the one of the plurality of frequencies, after the second upward link to said second master is connected, wherein a downward signal from said second master to said slave is transmitted via the time slot shifted from the second time slot by a predetermined number of time slots.

13. A method for connecting first and second masters using one of a plurality of frequencies, comprising the steps of:

connecting a first upward link to said first master by using a first time slot on the one of the plurality of frequencies;

receiving a signal from said first master indicating a second time slot on the one of the plurality of frequencies;

disconnecting the first upward link to said first master; and connecting a second upward link to said second master by using the second time slot, without connecting a downward link from said second master, in a state where the first upward link to said first master is still connected, in accordance with a first upward link signal received by said second master;

wherein the first upward link and the second upward link are used for speech communication.

14. A method according to claim 13, wherein the first upward link is used for transmission to said first master and the second upward link is used for transmission to said second master.

15. A method according to claim 13, further comprising a step of connecting aid second master and a second downward link by using a time slot on the one of the plurality of frequencies, after the second upward link to said second master is connected, wherein a downward signal from said second master to said slave is transmitted via the time slot shifted from the second time slot by a predetermined number of time slots.

16. A method for connecting a slave to first and second masters using the same frequency, comprising the steps of:
   connecting a first upward link and a first downward link using a time slot between the slave and the first master;
   sending a signal to the slave from the first master indicating a new time slot to be used for connecting the slave and the second master;
   connecting a second upward link between the slave and the second master using the new time slot without connecting the second downward link between the slave and the second master;
   connecting a second downward link between the slave and the second master using the new time slot; and
   disconnecting the first upward link and the first downward link;
   wherein the first upward link and the second upward link are used for speech communication.

17. A method according to claim 16, wherein the signal is sent in accordance with a request from the slave.

18. A method according to claim 16, wherein the second upward link is connected in accordance with a request from the slave.

19. A method according to claim 16, wherein the second upward link is connected in accordance with a request from the slave received by the second master via the first upward link.

20. A method according to claim 16, wherein the second upward link is connected in accordance with a connection between the second master and a communication partner of the slave.

21. A method according to claim 16, wherein the first upward link and the first downward link are disconnected in accordance with a connection between the second master and a communication partner of the slave.

22. A communication apparatus comprising:
   connecting means for connecting a slave to first and second masters using the same frequency;
   control means for controlling said connecting means such at a first upward link and a first downward link are connected using a time slot between the slave and the first master,
   wherein said control means controls said connecting means such that a first upward link and a first downward link using a time slot between the slave and the first master are connected,
   a signal is sent to slave from the first master indicating a new time slot to be used from connecting the slave and the second master,
   a second upward link between the slave and the second master is connected using the new time slot without connecting the second downward link between the master and the second master,
   a second downward link between the slave and the second master is connected using the new time slot, and
   the first upward link and the first downward link are disconnected;
   wherein the first upward link and and second upward link are used for speech communication.

23. An apparatus according to claim 22, wherein said control means controls said connecting means such that the signal is sent in accordance with a request from the slave.

24. An apparatus according to claim 22, wherein said control means controls said connecting means such that the second upward link is connected in accordance with a request from the slave.

25. An apparatus according to claim 22, wherein said control means controls said connecting means such that the second upward link is connected in accordance with a request from the slave received by the second master via the first upward link.

26. An apparatus according to claim 22, wherein said control means controls said connecting means such that the second upward link is connected in accordance with a connection between the second master and a communication partner of the slave.

27. An apparatus according to claim 22, wherein said control means controls said connecting means such that the first upward link and the first downward link are disconnected in accordance with a connection between the second master and a communication partner of the slave.

* * * * *

UNITED STATES PATENT AND TRADEMARK OFFICE
CERTIFICATE OF CORRECTION

PATENT NO. : 6,243,583 B1
DATED : June 5, 2001
INVENTOR(S) : Tsutsui et al.

It is certified that error appears in the above-identified patent and that said Letters Patent is hereby corrected as shown below:

<u>Column 6,</u>
Line 30, delete "lowered" and insert therefor -- lower --

<u>Column 7,</u>
Line 2, delete "level." and insert therefor -- level --
Line 15, delete "form" and insert therefor -- from --

<u>Column 9,</u>
Line 42, delete "unit-60" and insert therefor -- unit 60 --

<u>Column 13,</u>
Line 10, delete "according to claim 4," and insert therefor -- according to claim 1, --

<u>Column 14,</u>
Line 64, delete "aid" and insert therefor -- said --

<u>Column 15,</u>
Line 20, delete "communication" and insert therefor -- communications --

<u>Column 16,</u>
Line 19, delete "communication" and insert therefor -- communications --

Signed and Sealed this

First Day of October, 2002

*Attest:*

JAMES E. ROGAN
*Director of the United States Patent and Trademark Office*

*Attesting Officer*